US009530211B2

(12) United States Patent
Mochizuki et al.

(10) Patent No.: US 9,530,211 B2
(45) Date of Patent: Dec. 27, 2016

(54) DISPLAY CONTROL APPARATUS, A METHOD OF CONTROLLING A DISPLAY CONTROL APPARATUS AND DISPLAY APPARATUS

(71) Applicant: Panasonic Intellectual Property Management Co., Ltd., Osaka (JP)

(72) Inventors: Makoto Mochizuki, Kanagawa (JP); Koichi Emura, Kanagawa (JP); Hayashi Ito, Chiba (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 61 days.

(21) Appl. No.: 14/594,044

(22) Filed: Jan. 9, 2015

(65) Prior Publication Data
US 2015/0213592 A1     Jul. 30, 2015

(30) Foreign Application Priority Data

Jan. 30, 2014  (JP) .................................. 2014-015494
Oct. 3, 2014   (JP) .................................. 2014-204828

(51) Int. Cl.
*G06T 7/00*    (2006.01)
*G06T 11/20*   (2006.01)
*G06K 9/78*    (2006.01)
*B60K 35/00*   (2006.01)
*G01C 21/36*   (2006.01)
(Continued)

(52) U.S. Cl.
CPC .............. *G06T 7/004* (2013.01); *B60K 35/00* (2013.01); *G01C 21/365* (2013.01); *G02B 27/01* (2013.01); *G02B 27/0179* (2013.01); *G06K 9/00805* (2013.01); *G06T 11/20* (2013.01);
(Continued)

(58) Field of Classification Search
None
See application file for complete search history.

(56) References Cited

U.S. PATENT DOCUMENTS

2005/0154505 A1*  7/2005  Nakamura ........... G01C 21/365
                                                           701/1
2016/0207399 A1*  7/2016  Ogasawara ............ B60K 35/00

FOREIGN PATENT DOCUMENTS

JP    2005-207778    8/2005
JP    2006-078635    3/2006
(Continued)

OTHER PUBLICATIONS

The Extended European Search Report dated Jun. 16, 2015 for the related European Patent Application No. 15150460.2.

*Primary Examiner* — Kimberly A Williams
(74) *Attorney, Agent, or Firm* — Greenblum & Bernstein, P.L.C.

(57) ABSTRACT

A method of controlling a display control apparatus in a display system includes causing a display unit to generate a first certain image indicating a first presentation image to be overlapped on a certain object in display on a display medium on the basis of the recognized certain object; determining a wiping area wiped by a wiper on the display medium on the basis of detected position after the first presentation image is displayed on the display medium; and causing the display unit to generate a second certain image indicating a second presentation image resulting from deletion of a portion corresponding to the wiping area in the first presentation image in the display on the display medium.

11 Claims, 22 Drawing Sheets

(51) Int. Cl.
*G02B 27/01* (2006.01)
*G06K 9/00* (2006.01)
(52) U.S. Cl.
CPC .............. *G02B 2027/014* (2013.01); *G02B 2027/0138* (2013.01); *G06T 2207/30261* (2013.01)

(56) References Cited

FOREIGN PATENT DOCUMENTS

| | | |
|---|---|---|
| JP | 2009-107494 | 5/2009 |
| JP | 2009-248721 | 10/2009 |

* cited by examiner

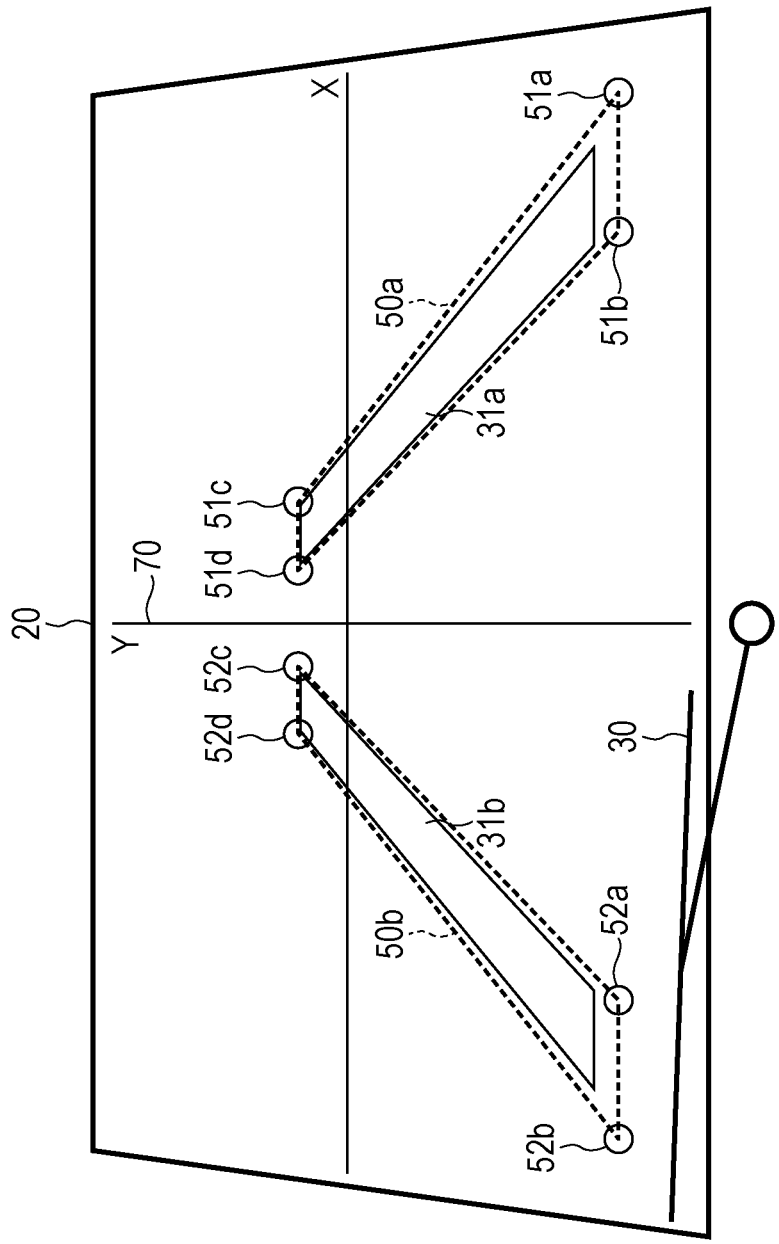

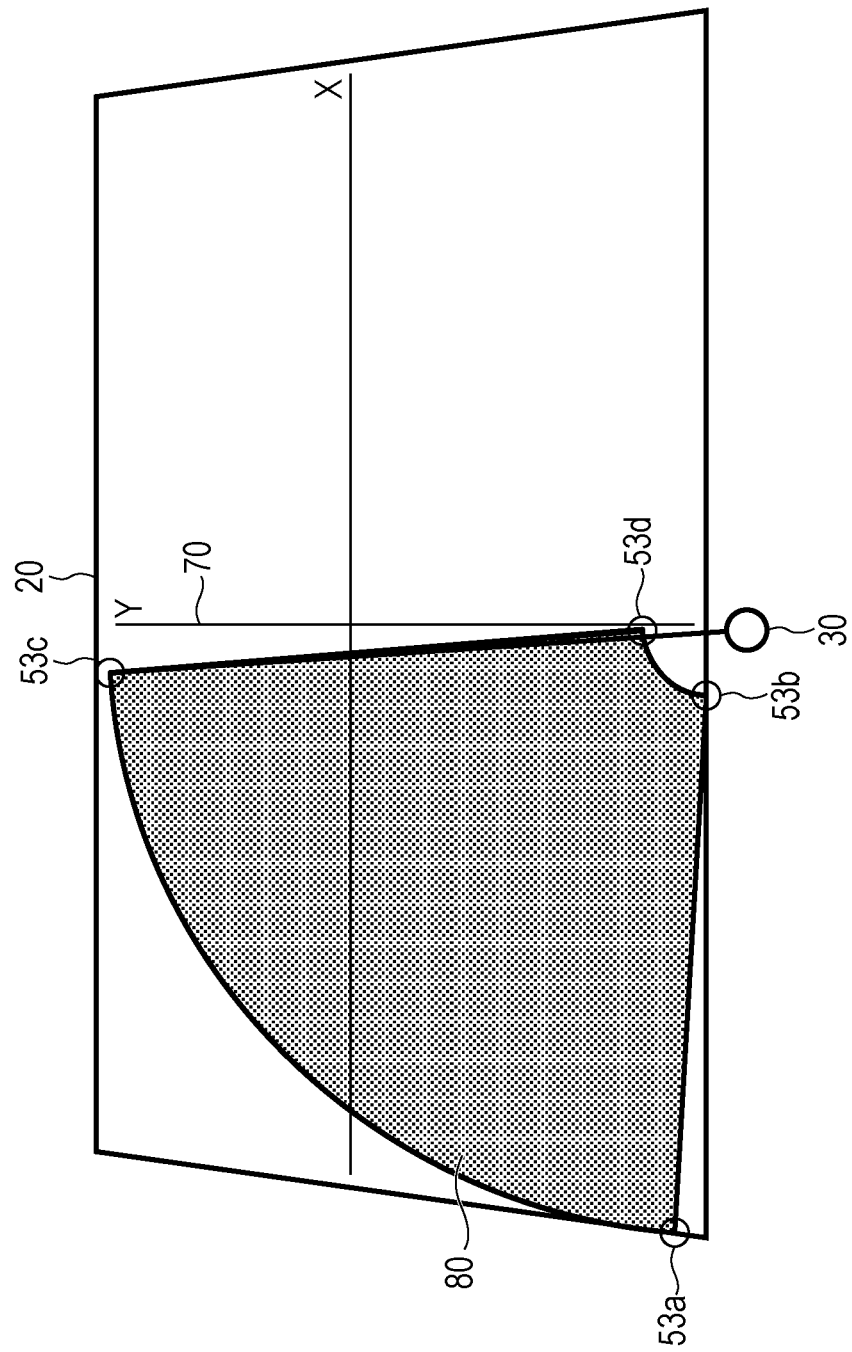

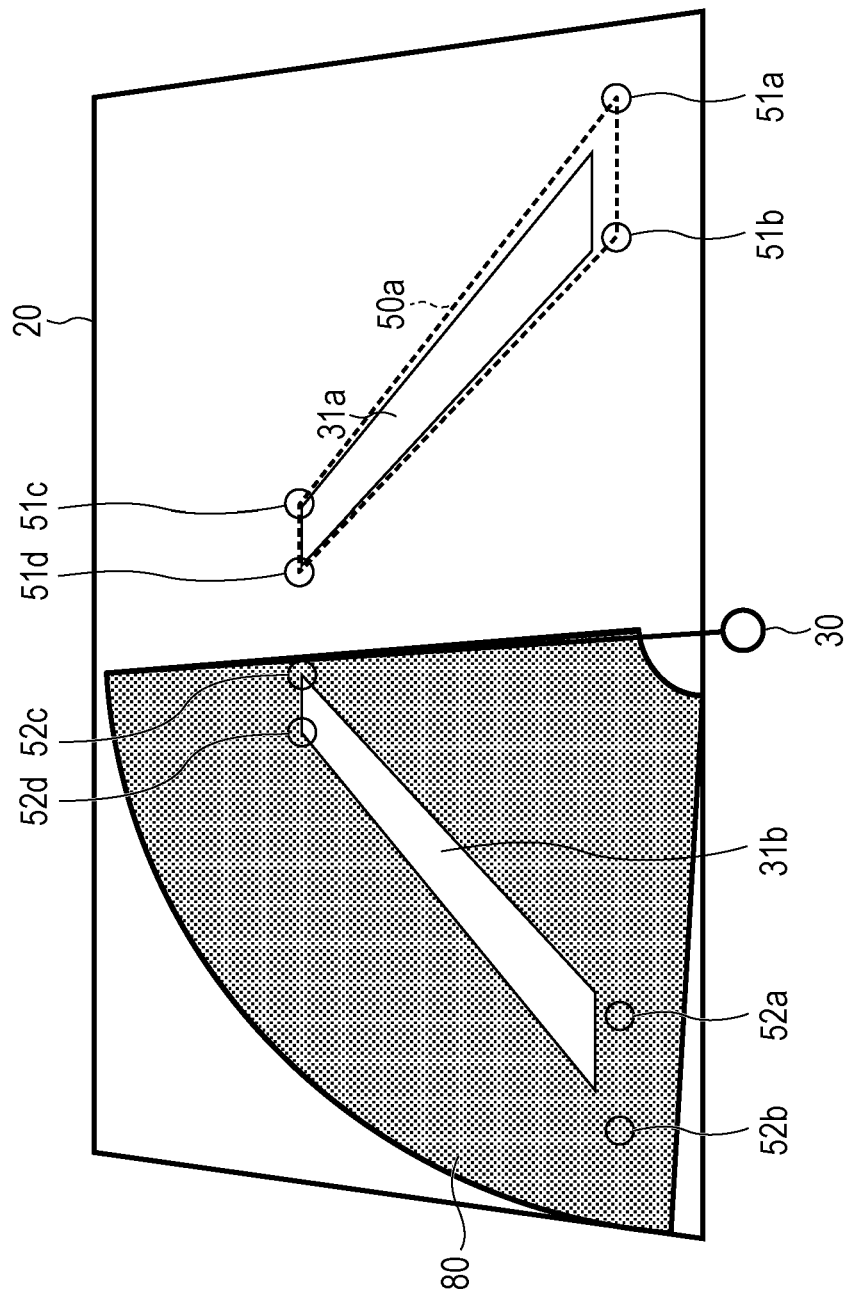

DISPLAY CONTROL APPARATUS, A METHOD OF CONTROLLING A DISPLAY CONTROL APPARATUS AND DISPLAY APPARATUS

CROSS REFERENCES TO RELATED APPLICATIONS

This Application claims priority to Japanese Patent Application No. 2014-015494 filed on Jan. 30, 2014 and Japanese Patent Application No. 2014-204828 filed on Oct. 3, 2014, the contents of which are hereby incorporated by reference.

BACKGROUND

1. Technical Field

The present disclosure relates to a display control apparatus, a method of controlling a display control apparatus and a display apparatus for controlling display of information to be provided to an occupant of a vehicle or the like.

2. Description of the Related Art

Head up displays (HUDs) that project images on windshields of vehicles to cause drivers to visually recognize virtual images have been actively developed in recent years. For example, overlap and display of virtual images on images in actual world allows the viewability of objects to be improved.

However, the viewability of the objects is varied with the situations in the view fields of the drivers. For example, a technology disclosed in Japanese Unexamined Patent Application Publication No. 2009-248721 (hereinafter referred to as related art) is a method of varying the virtual image to be displayed in the view field of a driver depending on the viewability of an object.

In a display control method in the related art, the viewability of an object (for example, an obstacle) detected with a camera or the like is estimated to generate the virtual image in accordance with the estimated viewability in order to display an appropriate virtual image depending on the viewability of the object. Specifically, if the viewability of the obstacle is estimated to be high, a frame is generated as the virtual image and the frame is displayed around the object. If the viewability of the obstacle is estimated to be low, a mark is generated as the virtual image and the mark is overlapped and displayed on the position of the object.

However, in the display control method in the related art, the viewability of the object is estimated on the basis of image analysis or sensor information to only display the virtual image corresponding to the result of the estimation. Accordingly, the display of the virtual image matched with the viewability of the object is not necessarily realized for a user.

SUMMARY

One non-limiting and exemplary embodiment provides a display control method, a display control apparatus, and a display apparatus capable of controlling display of a virtual image in accordance with the viewability of an object, which is varied momentarily.

Additional benefits and advantages of the disclosed embodiments will be apparent from the specification and Figures. The benefits and/or advantages may be individually provided by the various embodiments and features of the specification and drawings disclosures, and need not all be provided in order to obtain one or more of the same.

In one general aspect, the techniques disclosed here feature a method of controlling a display control apparatus in a display system including a recognition unit that recognizes a certain object existing in a front direction or a side direction of a movable body, a detection unit that detects a position of a wiper, which wipes a display medium at least including a windshield of the movable body, and a display unit that generates a certain image to display the certain image on the display medium. The display control method includes causing the display unit to generate a first certain image indicating a first presentation image to be overlapped on the certain object on the display medium on the basis of a result of the recognition of the certain object; determining a wiping area wiped by the wiper on the display medium on the basis of position information about the wiper after the first presentation image is displayed on the display medium; and causing the display unit to generate a second certain image indicating a second presentation image resulting from deletion of a portion corresponding to the wiping area in the first presentation image on the display medium.

In one general aspect, the techniques disclosed here feature a display control apparatus in a display system including a recognition unit that recognizes a certain object existing in a front direction or a side direction of a movable body, a detection unit that detects a position of a wiper, which wipes a display medium at least including a windshield of the movable body, and a display unit that displays a certain image generated on the basis of a result of the recognition by the recognition unit on the display medium. The display control apparatus includes a determination unit that determines a wiping area wiped by the wiper on the display medium on the basis of position information about the wiper detected by the detection unit; and a control unit that controls the display unit so as to generate the certain image indicating a presentation image to be overlapped on the certain object in an area other than the wiping area on the display medium on the basis of the result of the recognition of the certain object by the recognition unit.

In one general aspect, the techniques disclosed here feature a display apparatus in a display system including a recognition unit that recognizes a certain object existing in a front direction or a side direction of a movable body and a detection unit that detects a position of a wiper, which wipes a display medium at least including a windshield of the movable body. The display apparatus includes a display unit that generates a certain image to display the certain image on the display medium; a determination unit that determines a wiping area wiped by the wiper on the basis of position information about the wiper detected by the detection unit; and a control unit that, if the certain object is recognized by the recognition unit, controls the display unit so as to generate the certain image indicating a presentation image to be overlapped on the certain object in an area other than the wiping area.

According to the present disclosure, it is possible to control the display of the virtual image in accordance with the viewability of an object, which is varied momentarily.

These general and specific aspects may be implemented using a system, a method, and a computer program, and any combination of system, methods, and computer programs.

BRIEF DESCRIPTION OF THE DRAWINGS

FIG. 5 illustrates an exemplary screen corresponding system according to the first embodiment of the present disclosure;

FIG. 6 illustrates an exemplary wiping area according to the first embodiment of the present disclosure;

FIG. 7 illustrates an example of how the virtual image is displayed according to the first embodiment of the present disclosure;

DETAILED DESCRIPTION

Underlying Knowledge Forming Basis of the Present Disclosure

In the related art (Japanese Unexamined Patent Application Publication No. 2009-248721), the amount of rainfall is detected with a rain sensor to estimate the viewability of obstacles. A person skilled in the art can easily practice a technology to "estimate to be in low visibility if the amount of rainfall detected by the rain sensor is higher than or equal to a predetermined value and display a virtual image representing an object, such as a white line on a road, a sign, or a road marking" on the basis of the related art although the technology is not specifically described in the related art. However, if the virtual image is uniformly displayed, the virtual image matched with the surrounding environment of a vehicle, which is varied momentarily, is not displayed.

For example, if the viewability of a foreground object is reduced due to heavy rain, the virtual image representing the object may be projected on a windshield in a head up display system to compensate the poor viewability of the foreground. However, wiping of the windshield by a wiper temporarily improves the poorness of the front-side visibility due to rain drops. If the virtual image is projected in this state, there is a problem in that the virtual image may be troublesome to an occupant. Accordingly, embodiments according to the present disclosure resolve such a problem to realize the display control of the virtual image in accordance with the viewability of the object, which is varied momentarily.

First Embodiment

A first embodiment of the present disclosure will now be described with reference to the drawings.

Figure 1:
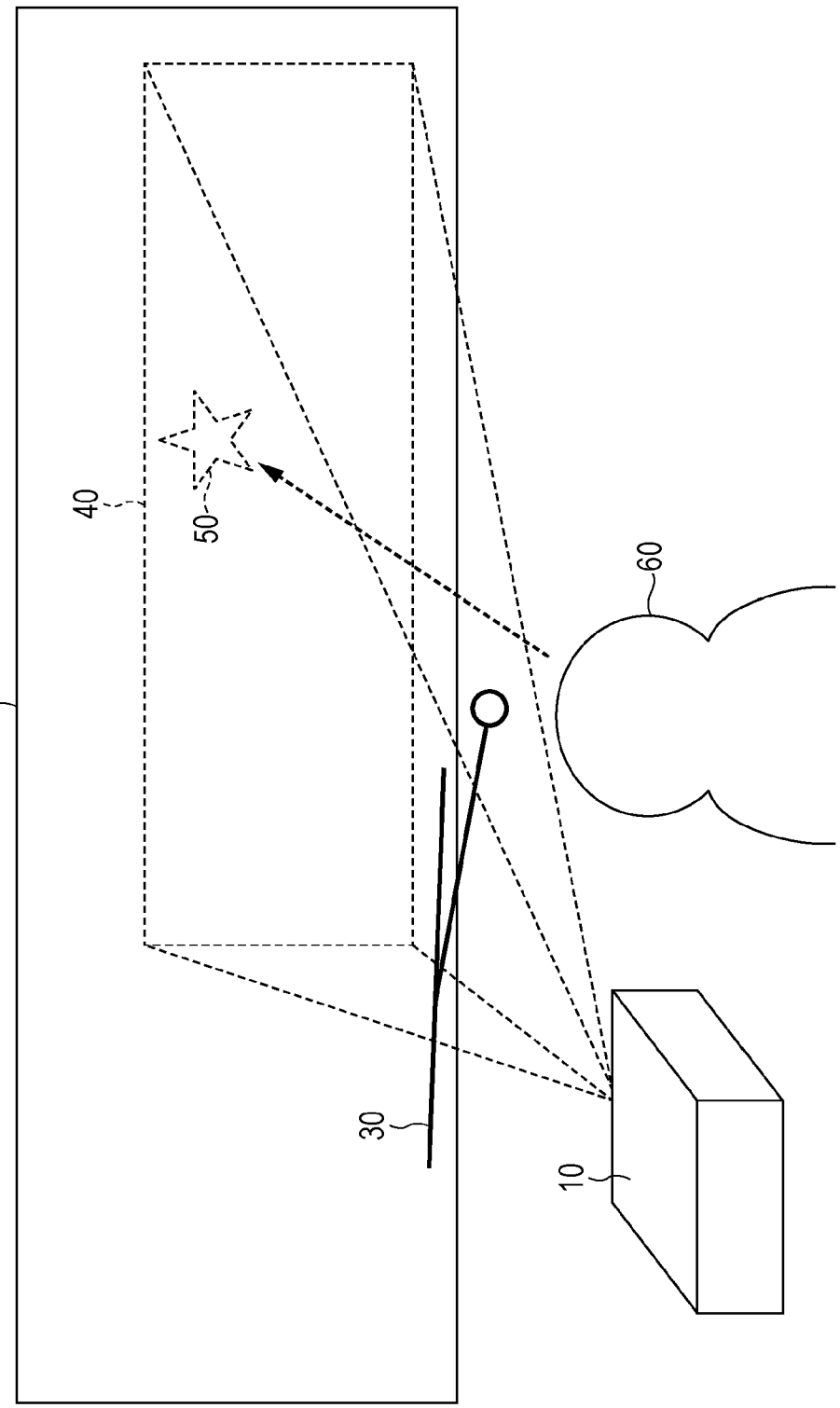
FIG. 1 illustrates an exemplary head up display system according to first to sixth embodiments of the present disclosure.

FIG. 1 illustrates an exemplary head up display system (hereinafter referred to as an HUD system) to which a display control apparatus according to an embodiment is applied (refer to FIG. 2 described below since the display control apparatus is not illustrated in FIG. 1). The HUD system is used in a movable body, such as a vehicle. Although the HUD system is applied to the vehicle in the embodiments, the movable body is not limited to the vehicle and may be a vessel, an aircraft, or the like. The HUD system is an example of a display system 1 described below with reference to FIG. 2.

Referring to FIG. 1, the HUD system includes a display apparatus 10 and a display medium 20. The HUD system also includes a recognition unit 200 and a detection unit 300 described below although the recognition unit 200 and the detection unit 300 are not illustrated in FIG. 1.

The display apparatus 10 has, for example, a projector function and displays a certain image generated in the display apparatus 10 on the display medium 20. The display apparatus 10 includes a display control apparatus 100 (refer to FIG. 2 described below). When the display apparatus 10 has the projector function, the display means projection. When the display medium is a transmissive display provided on a surface of the windshield or provided in the inside of the windshield, the display apparatus 10 has a function to generate image data and displays the generated image data on the display medium 20. In other words, the definition of the display includes not only the meaning of the display but also the meaning of the projection in the present disclosure.

The display medium 20 at least includes the windshield of the vehicle. In other words, the display medium 20 may be the windshield itself. Alternatively, the display medium 20 may include the windshield and a reflecting film incorporated in the windshield. Alternatively, the display medium 20 may include the windshield and a transmissive display provided on a surface of the windshield or provided in the inside of the windshield. In the present disclosure, the display medium at least includes the windshield. The transmissive display is, for example, a transmissive organic electroluminescence (EL) display or a transparent display using glass that emits light upon irradiation with light of a specific wavelength. A driver is capable of visually recognizing the display on the transmissive display concurrently with the background. The transmissive display is a display medium that transmits the light. The windshield may be glass of a front window, glass of a side window, or glass of a rear window.

A presentation image 50 described below is displayed in a display area 40, which is a certain area on the display medium 20, by the display apparatus 10. The presentation image 50 is the virtual image when the display apparatus 10 has the projector function. Although the display area 40 is part of the display medium 20 in the example in FIG. 1, the display area 40 may be the entire display medium 20.

A wiper 30 wipes the windshield of the vehicle.

As illustrated in FIG. 1, the presentation image 50 to be presented to an occupant 60 of the vehicle (an example of a user) is displayed in the display area 40 on the display medium 20 by the display apparatus 10. The presentation image 50 is an image resulting from display of the certain image generated in the display apparatus 10 on the display medium 20.

When the display apparatus 10 has the projector function, the presentation image 50 is the virtual image and the certain image that is generated in the display apparatus 10 and that is projected on the display medium 20 is visually recognized by the occupant 60. The virtual image is, for example, an augmented reality (AR) image. The presentation image 50 that is displayed on the display medium as the result of the projection of the certain image is visually recognized by the occupant 60 as the virtual image. Since the principle that the projected presentation image 50 is visually recognized by the occupant 60 as the virtual image is known, a description of the principle is omitted herein. Although the presentation image 50 is a graphic in the example in FIG. 1, the presentation image 50 may be a character, a symbol, or any combination of a character, a symbol, and/or a graphic.

An exemplary configuration of the display system 1 according to the first embodiment will now be described. FIG. 2 is a block diagram illustrating the exemplary configuration of the display system 1 according to the first embodiment.

Although the display apparatus 10 is described to have the projector function in the following description, this does not limit the scope of the present disclosure. The same description applies also to a case in which the display apparatus 10 does not have the projector function and the display medium 20 is the transmissive display.

Figure 2:
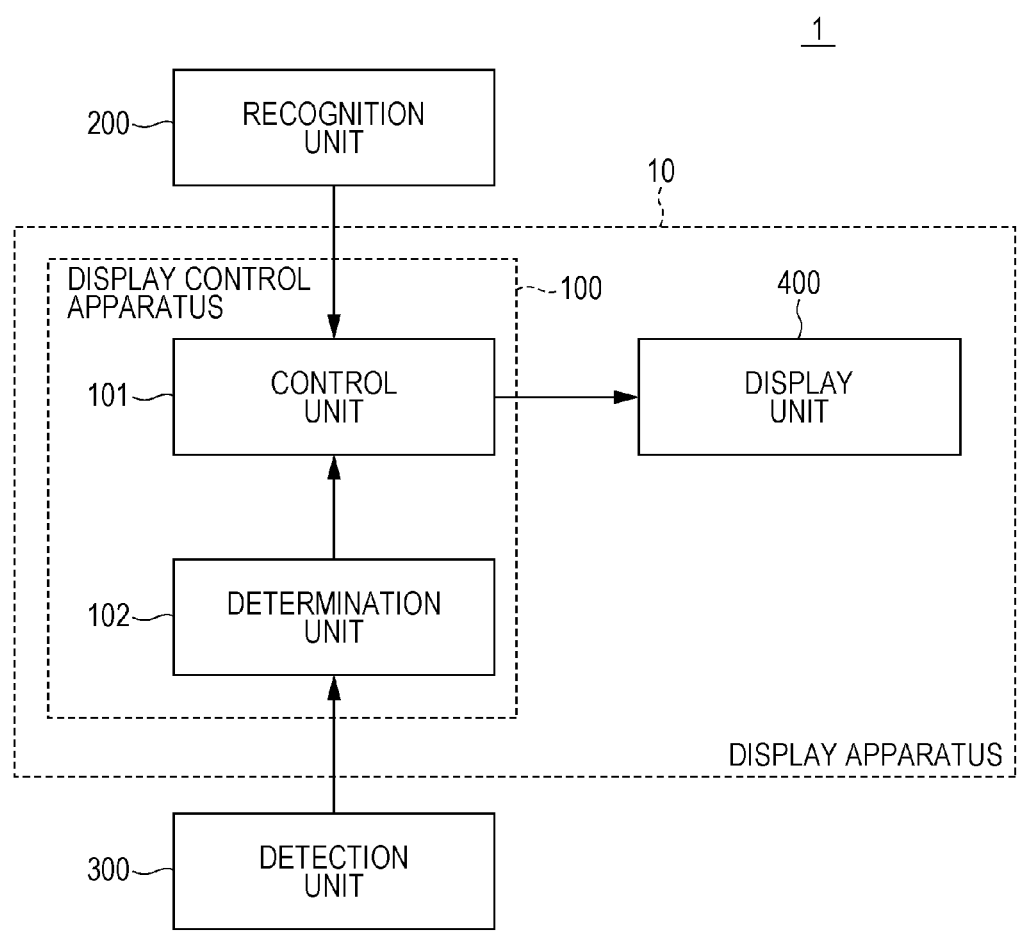
FIG. 2 is a block diagram illustrating an exemplary configuration of a display system according to the first embodiment of the present disclosure.

Referring to FIG. 2, the display system 1 includes the display apparatus 10, the recognition unit 200, and the detection unit 300. The display apparatus 10 includes the display control apparatus 100 and a display unit 400.

The display control apparatus 100 includes a control unit 101 and a determination unit 102. The display control apparatus 100 controls the display unit 400 on the basis of information supplied from the recognition unit 200 and the detection unit 300. The display control apparatus 100 will be described in detail below.

The recognition unit 200 recognizes a certain object existing in the landscape of the front direction or a side direction of the occupant of the movable body. The recognition unit 200 recognizes the certain object existing in the foreground of the occupant of the vehicle every predetermined time period. The recognition unit 200 is, for example, a sensing camera. The sensing camera is mounted in the inside of the vehicle or mounted on the outside of the vehicle to capture a foreground image of the vehicle. In this case, the recognition unit 200 recognizes the certain object using, for example, pattern matching. The object is, for example, a while line on a road, a sign, a road marking, a curbstone, a guardrail, a signal, a telephone pole, a vehicle, a person, or a building. The recognition unit 200 may be a radar apparatus. The radar apparatus is mounted in the inside of the vehicle or mounted on the outside of the vehicle to sense the foreground of the vehicle. In this case, the recognition unit 200 extracts the certain object from the sensed foreground information with clustering or machine learning to recognize the extracted certain object. Since the object recognition technology in the display medium 20 is known, a detailed description of the object recognition technology in the display medium 20 is omitted herein.

The detection unit 300 detects the position of the wiper 30, which wipes the display medium 20 of the movable body. The detection unit 300 detects the position of the wiper 30 provided on the vehicle every predetermined time period. The wiper 30 specifically means a wiper arm that wipes the windshield of the vehicle. For example, the detection unit 300 may calculate the position of the wiper arm on the windshield on the basis of the rotation angle of a wiper motor, which is acquired from a wiper encoder (not illustrated). Alternatively, the detection unit 300 may measure an elapsed time since the start of the operation of the wiper arm to calculate the position of the wiper arm on the windshield on the basis of the elapsed time, the movement angular velocity of the wiper arm, and the operation interval of the wiper arm. Alternatively, the detection unit 300 may detect the position of the wiper arm on the windshield on the basis of an image of the wiper arm captured by a camera (not illustrated), which is separately provided. The method of detecting the position of the wiper arm is not limited to the above ones.

The display unit 400 displays the certain image generated on the basis of the result of the recognition by the recognition unit 200 on the display medium 20. The display unit 400 has, for example, the projector function of the display apparatus 10. Specifically, the display unit 400 generates the certain image under the control of the display control apparatus 100 to project the certain image on the windshield.

The display control apparatus 100 will now be described in detail. As described above, the display control apparatus 100 includes the control unit 101 and the determination unit 102.

When the certain object is recognized by the recognition unit 200, the control unit 101 provides image information on the presentation image 50 to be overlapped and displayed on the object to the display unit 400 and controls the display unit 400 so as to generate the certain image corresponding to the presentation image 50. An example of how the presentation image 50 is displayed will now be described with reference to FIG. 3. The overlap means that the presentation image is generated so as to be overlapped and displayed on the object to cause the occupant to visually recognize the presentation image. For example, when the object is a sign or a white line, for example, an image that is overlapped on the sign or the white line in the foreground and that indicates the outline of the sign or the white line is the presentation image that is overlapped.

Figure 3:
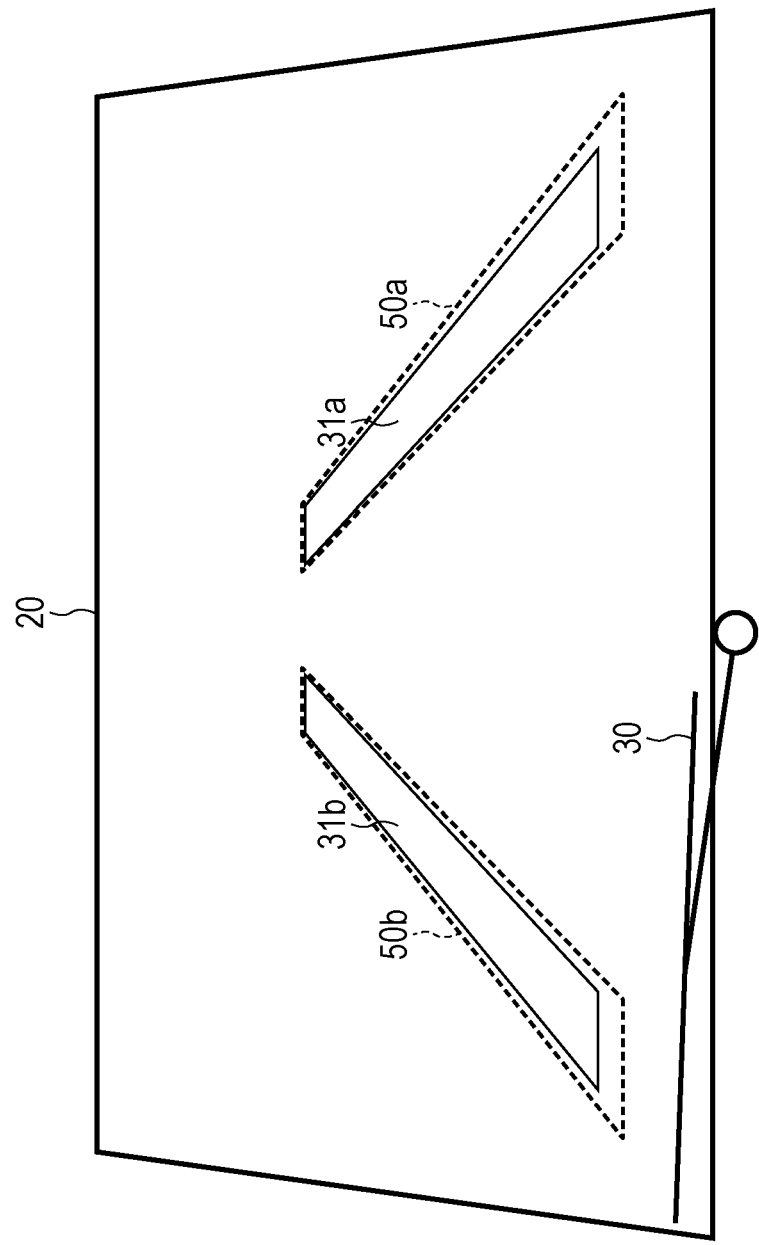
FIG. 3 illustrates an example of how virtual images are displayed in the first embodiment of the present disclosure.

FIG. 3 illustrates an example of how presentation images 50a and 50b are displayed on the display medium 20 by the display apparatus 10. The entire display medium 20 is the display area 40 in the example in FIG. 3.

Upon detection of white lines 31a and 31b, which are certain objects, by the recognition unit 200, the display control apparatus 100 acquires the result of the recognition of the objects from the recognition unit 200 as recognition result information. The result of the recognition includes, for example, information indicating that the white lines 31a and 31b are detected and position information about the white lines 31a and 31b. The display control apparatus 100 controls the display unit 400 so as to generate the certain images indicating the presentation images 50a and 50b on the basis of the result of the recognition by the recognition unit 200. The display unit 400 generates the certain images indicating the presentation images 50a and 50b, which are the virtual images in the projection on the display medium 20, and projects the certain images on the display medium 20. As a result, as illustrated in the example in FIG. 3, the presentation images 50a and 50b are overlapped and displayed on the white lines 31a and 31b, respectively, to cause the occupant 60 to visually recognize the presentation images 50a and 50b as the virtual images.

The presentation images 50a and 50b may be constantly displayed, may be displayed only in low visibility as in the related art described above, or may be displayed only when a certain operation is performed by the occupant 60.

Although the example of how the virtual images are displayed described above is a known technology, the first embodiment is characterized in that the control unit 101 controls the display of the virtual images when the display of the virtual images is performed in the above manner and the wiper 30 works.

Specifically, when a wiping area is determined by the determination unit 102 described below, the control unit 101 controls the display unit 400 so as to generate the certain image indicating the presentation image 50 to be overlapped on the certain object in an area other than the wiping area (hereinafter also referred to as a "non-wiping area") in the display on the display medium 20. The wiping area is an area wiped by the wiper 30 in the display area 40. The non-wiping area is an area that is not wiped by the wiper 30 in the display area 40.

Each time the determination unit 102 acquires information about the wiping position detected by the detection unit 300 (the position of the wiper 30 on the windshield) from the detection unit 300, the determination unit 102 temporarily stores the wiping position information. The determination unit 102 determines the wiping area described above on the basis of the pieces of wiping position information that are temporally continuously stored.

Figure 4:
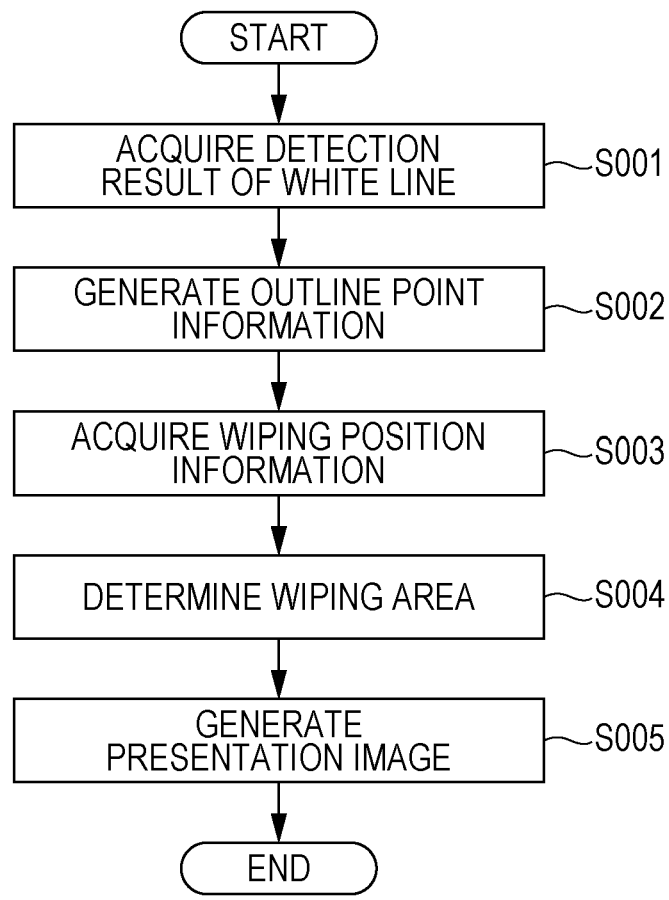
FIG. 4 is a flowchart illustrating an exemplary operational process of a display control apparatus according to the first embodiment of the present disclosure.

An exemplary operation of the display control apparatus 100 will now be described. FIG. 4 is a flowchart illustrating an exemplary operational process of the display control apparatus 100 according to the first embodiment. The flowchart in FIG. 4 illustrates the exemplary operational process while the wiper 30 is wiping the windshield. The exemplary operational process in FIG. 4 is performed at predetermined time interval, such as every 10 milliseconds or every 100 milliseconds. It is assumed here that the objects are white lines (for example, the white lines 31a and 31b illustrated in FIG. 3).

Referring to FIG. 4, in Step S001, the control unit 101 acquires the result of detection of the white lines on the road from the recognition unit 200. The result of the detection includes the information indicating that the white lines are detected and the position information about the white lines, as described above.

In Step S002, the control unit 101 generates outline point information on the basis of the result of the detection of the white lines. A specific example of how the outline point information is generated will now be described with reference to FIG. 5. The same reference numerals are used in FIG. 5 to identify the same components in FIG. 3. For example, the outline point information is generated as coordinate information in a coordinate system 70 with respect to the front side of the windshield. In the example in FIG. 5, the control unit 101 generates the outline point information indicating the coordinates of outline points 51a, 51b, 51c, and 51d of the presentation image 50a and outline points 52a, 52b, 52c, and 52d of the presentation image 50b.

Referring back to FIG. 4, in Step S003, the determination unit 102 acquires the position information about the wiper from the detection unit 300.

In Step S004, the determination unit 102 determines the wiping area on the basis of the wiping position information. The wiping area is, for example, an area wiped by the wiper 30 from the time when the wiper 30 starts the wiping to the current time. FIG. 6 illustrates an example of the wiping area. In the example in FIG. 6, the determination unit 102 determines an area surrounded by the coordinates at wiping positions (outline points) 53a and 53b at the time when the wiper 30 starts the wiping and the coordinates at wiping positions (outline points) 53c and 53d at the current time to be a wiping area 80.

Referring back to FIG. 4, in the outline point information generated in Step S002, the control unit 101 extracts only the outline point information that is not included in the wiping area determined in Step S004. In Step S005, the control unit 101 controls the display unit 400 so as to generate the certain image indicating the presentation image based on the outline point information on the display medium 20. An example of the control will now be described with reference to FIG. 7. In the example in FIG. 7, the control unit 101 extracts only the outline points 51a to 51d that are not included in the wiping area 80, among the outline points 51a to 51d and the outline points 52a to 52d. The control unit 101 controls the display unit 400 so as to generate the certain image corresponding to the presentation image 50a based on the outline points 51a to 51d. The display unit 400 generates the certain image corresponding to the presentation image 50a and projects the generated certain image on the windshield. As a result, the presentation image 50a is overlapped and displayed on the white line 31a, as illustrated in the example in FIG. 7. The presentation image 50b based on the outline points 52a to 52d (refer to FIG. 3) is not displayed, as illustrated in the example in FIG. 7.

Although Steps S003 and S004 are performed after Steps S001 and S002 in the flowchart illustrated in FIG. 4, the order of the steps is not limited to this. For example, Steps S001 and S002 may be performed after Steps S003 and S004 or Steps S001 and S002 may be performed in parallel with Steps S003 and S004.

Figure 22:
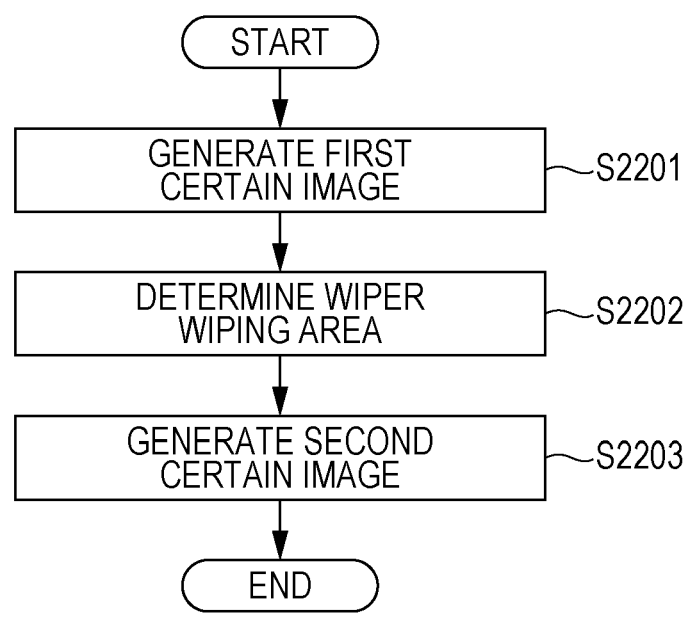
FIG. 22 is a flowchart illustrating an exemplary display control method in the display system according to an embodiment of the present disclosure.

The exemplary operation of the display control apparatus 100 is described above. An example of how the display of the virtual images is varied in the above exemplary operation will now be described with reference to FIGS. 8A to 8D and FIG. 22. FIGS. 8A to 8D illustrate how the display of the virtual images is varied in time series. FIG. 22 is a flowchart illustrating an exemplary display control method in the display system 1. The display control method is a display control method in the display system 1 including the recognition unit 200 that recognizes a certain object existing in the landscape of the front direction or a side direction of the occupant 60 of the movable body, the detection unit 300 that detects the position of the wiper, which wipes the display medium of the movable body, and the display unit 400 that generates a certain image to display the certain image on the display medium 20.

Referring to FIG. 22, in Step S2201, the display unit 400 is caused to generate a first certain image indicating a first presentation image to be overlapped on a certain object in the display on the display medium 20 on the basis of the result of the recognition of the certain object.

Specifically, when the first presentation images (the presentation images 50a and 50b illustrated in FIG. 8A) are displayed on the display medium, projection areas on the display medium 20 are determined so that the first presentation images are visually recognized by the occupant 60 with being overlapped on the white lines 31a and 31b, which are the certain objects, on the basis of the kinds of the objects and the position information included in the result of the recognition of the certain objects. The viewpoint of the occupant 60 may be a predetermined coordinate or may be measured by a driver monitoring camera. The viewpoint of the occupant 60 does not limit the scope of the present disclosure. The predetermined viewpoint position of the occupant 60 is, for example, a position 90 cm higher than a seat.

Since the process of causing the display unit 400 to generate the first certain images indicating the first presentation images (the presentation images 50a and 50b illustrated in FIG. 8A) to be overlapped on the white lines 31a and 31b, which are the certain objects, on the display medium 20 is described above, a description of the process is omitted herein.

Figure 8B:
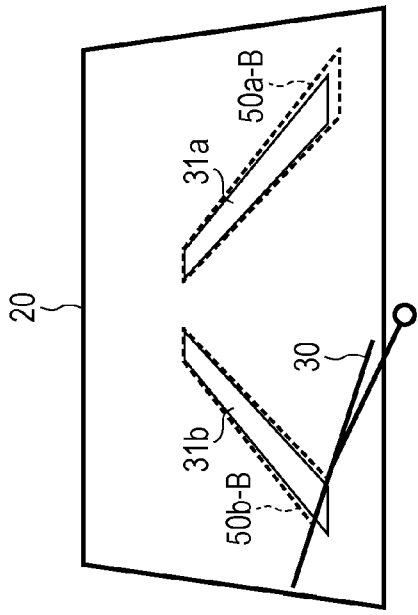
FIGS. 8A to 8D illustrate how the display of the virtual images is varied in time series.
Figure 8D:
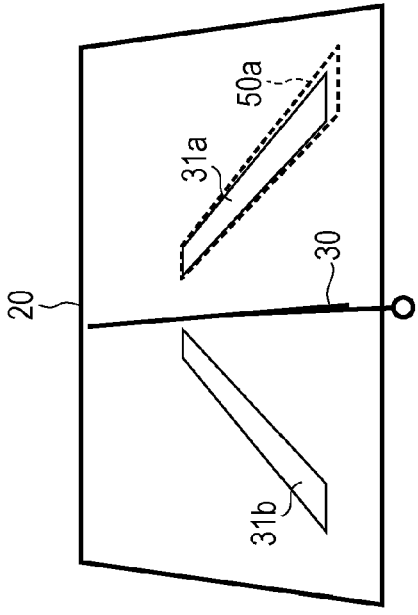
Figure 8A:
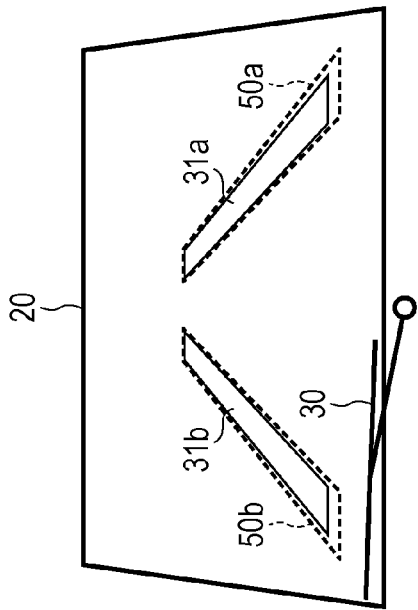

FIG. 8A illustrates a state when the wiping by the wiper 30 is not started, which corresponds to Step S2201 in FIG. 22. At this time, the presentation images 50a and 50b are overlapped and displayed on the white lines 31a and 31b, respectively. FIG. 8A is equal to FIG. 3.

Referring back to FIG. 22, in Step S2202, after the first presentation images (the presentation images 50a and 50b illustrated in FIG. 8A) are displayed on the display medium 20, the wiping area wiped by the wiper 30 on the display medium 20 is determined on the basis of the wiping position information detected by the detection unit 300. Since the specific processing is described above, a description of the determination of the wiping area is omitted herein.

In Step S2203, the display unit 400 is caused to generate second certain images indicating second presentation images (presentation images 50a-B and 50b-B illustrated in FIG. 8B or presentation images 50a-C and 50b-C illustrated in FIG. 8C) resulting from deletion of a portion corresponding to the wiping area in the first presentation images (the presentation images 50a and 50b illustrated in FIG. 8A) in the display on the display medium 20.

FIG. 8B illustrates a state when the wiping by the wiper 30 is started after the state illustrated in FIG. 8A and the wiper 30 has wiped part of the projection area of the presentation image 50b, which corresponds to Step S2203 in FIG. 22. At this time, part of the presentation image 50b is not overlapped and displayed and part of the actual white line 31b, which corresponds to the above presentation image 50b, is displayed in the area after the wiping by the wiper 30.

Figure 8C:
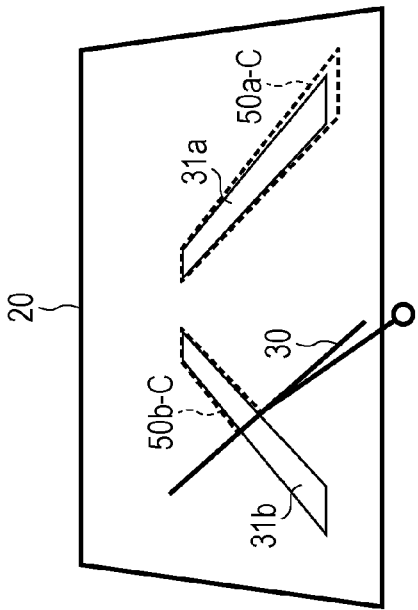

FIG. 8C illustrates a state when the wiping by the wiper 30 is further advanced after the state illustrated in FIG. 8B and the wiper 30 has wiped about half of the projection area of the presentation image 50b, which corresponds to Step S2203 in FIG. 22. At this time, about half of the presentation image 50b is not overlapped and displayed and about half of the actual white line 31b is displayed in the area after the wiping by the wiper 30.

FIG. 8D illustrates a state when the wiping by the wiper 30 is further advanced after the state illustrated in FIG. 8C and the wiper 30 has wiped the entire projection area of the presentation image 50b, which corresponds to Step S2203 in FIG. 22. At this time, the entire presentation image 50b is not overlapped and displayed and the entire actual white line 31b is displayed in the area after the wiping by the wiper 30. FIG. 8D is equal to FIG. 7.

Since the area where the presentation image 50a is projected is not wiped by the wiper 30 in FIGS. 8A to 8D, the presentation image 50a is constantly displayed.

Since the display of the presentation image 50b is varied in the above manner, the user feels that the displayed presentation image 50b disappears with the advancement of the wiping by the wiper 30.

The display control method described above may be a computer-implemented method executed by a computer in the display system 1. A display control program, which corresponds to the computer-implemented method and which is a computer program, is executed in the following manner.

The display control program is executed in the display system 1 including the recognition unit 200 that recognizes a certain object existing in the landscape of the front direction or a side direction of the occupant 60 of the movable body, the detection unit 300 that detects the position of the wiper, which wipes the display medium 20 of the movable body, and the display unit 400 that generates a certain image to display the certain image on the display medium 20. The display control program causes the computer in the display system 1 to execute a step of causing the display unit 400 to generate the first certain images indicating the first presentation images (the presentation images 50a and 50b in FIG. 8A) to be overlapped on certain objects in the display on the display medium 20 on the basis of the result of the recognition of the certain objects, a step of determining the wiping area wiped by the wiper on the display medium 20 on the basis of the wiping position information detected by the detection unit 300 after the first presentation images are displayed on the display medium 20, and a step of causing the display unit 400 to generate the second certain images indicating the second presentation images resulting from deletion of a portion corresponding to the wiping area in the first presentation images in the display on the display medium 20.

The second presentation images are images resulting from deletion of the portion corresponding to the wiping area in the first presentation images. In other words, the second presentation images are images that do not include the portion corresponding to the wiping area in the first presentation images or images resulting from exclusion of the portion corresponding to the wiping area in the first presentation images.

As described above, the first embodiment is characterized in that the control is performed so that the overlap and display of the presentation image (the virtual image) is not performed for the object existing in the area the viewability of which is improved by the wiping by the wiper. This control allows the virtual image not to be troublesome to the user after the viewability is improved and the user is capable of visually recognizing the object as it is. In other words, since the display of the virtual image is controlled in accordance with the viewability of the object, which is varied momentarily with the advancement of the wiping by the wiper, in the first embodiment, it is possible to ensure the front-side viewability optimal for the user even when the viewability of the object is varied with the advancement of the wiping by the wiper.

According to the first embodiment, the user is capable of visually recognizing the object with the presentation image overlapped and displayed thereon in the area where the wiping by the wiper is not performed and is capable of visually recognizing the actual object in the area where the wiping by the wiper is performed. In other words, the user is capable of constantly visually recognizing the object while the wiper is working. In addition, since the user constantly visually recognizes the object, the user is capable of recognizing that the display control apparatus 100 normally operates and that the reliability of the virtual image is high.

Figure 9:
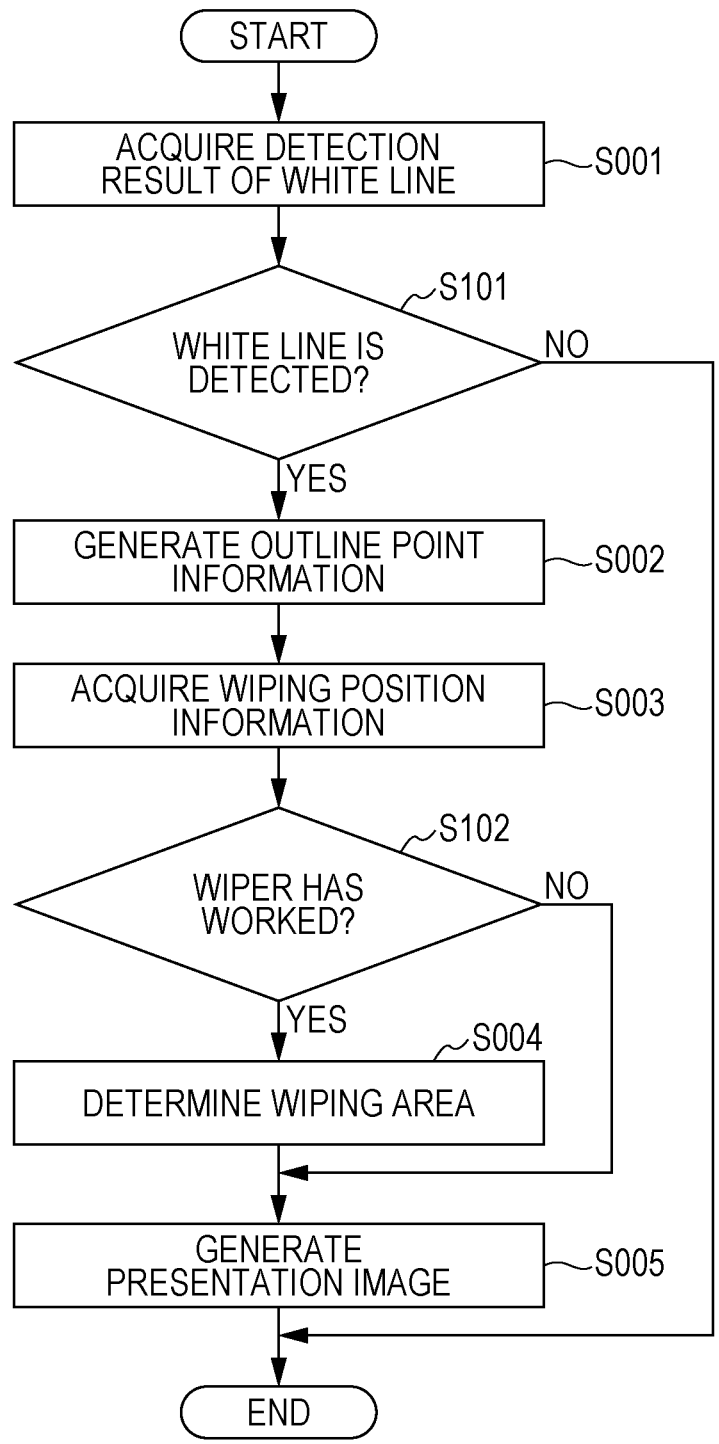
FIG. 9 is a flowchart illustrating an exemplary operational process of the display control apparatus according to a modified example of the first embodiment of the present disclosure.

The first embodiment is described above. The following operation may be performed as a modified example of the first embodiment. The modified example will now be described with reference to FIG. 9. FIG. 9 is a flowchart illustrating an exemplary operational process of the modified example. The flowchart in FIG. 9 illustrates the exemplary operational process while the wiper 30 is wiping the windshield. The exemplary operational process in FIG. 9 is performed at predetermined time interval, such as every 10 milliseconds or every 100 milliseconds. The same step numbers are used in the flowchart in FIG. 9 to identify the same steps in FIG. 4. A description of such steps is omitted herein. It is assumed here that the objects are white lines (for example, the white lines 31a and 31b illustrated in FIG. 3).

Referring to FIG. 9, after Step S001, in Step S101, the control unit 101 determines whether the white lines are detected on the basis of the result of the detection of the white lines acquired from the recognition unit 200.

If the information indicating that the white lines are detected and the position information about the white lines are acquired as the result of the detection of the white lines, the control unit 101 determines that the white lines are detected (YES in Step S101). Then, the process goes to Step S002.

If information indicating that no white line is detected is acquired as the result of the detection of the white lines, the control unit 101 determines that no white line is detected (NO in Step S101). Then, the process in FIG. 9 is terminated.

After Steps S002 and S003, in Step S102, the determination unit 102 determines whether the wiper 30 has worked on the basis of the wiping position information acquired from the detection unit 300.

If the wiping positions that are continuously acquired during a predetermined time period are not equal to each other, the determination unit 102 determines that the wiper 30 has worked (YES in Step S102). Then, the process goes to Step S004. Since the process is through the determination of the wiping area (Step S004) in this case, in Step S005, the control unit 101 controls the display unit 400 so as to generate the certain images indicating the presentation images 50 (for example, the presentation images 50a and 50b illustrated in FIG. 3, etc.) only in the non-wiping area on the display medium 20.

If the wiping positions that are temporally continuously acquired are equal to each other, the determination unit 102 determines that the wiper 30 has not worked (NO in Step S102). Then, the process goes to Step S005. Since the process is not through the determination of the wiping area (Step S004) in this case, in Step S005, the control unit 101 controls the display unit 400 so as to generate the certain images indicating the presentation images 50 (for example, the presentation images 50a and 50b illustrated in FIG. 3, etc.) in the entire display area 40 in the display on the display medium 20.

As described above, according to the exemplary operation of the modified example, the virtual images are displayed in the entire projection area when the wiper does not work and the virtual images are displayed only in the non-wiping area when the wiper works. In other words, the presentation images are displayed only when the foreground viewability is poor and no presentation image is displayed when the foreground viewability is good. Since the presence of the objects is emphasized with the virtual images only when the foreground viewability is poor due to rainfall or the like, as described above, it is possible to reduce the inconvenience caused by the display of the virtual images. The user is capable of appropriately recognizing the existence of the foreground object without feeling the inconvenience.

Modified Example

Although the presentation image is displayed on the display medium 20 regardless of the distance from the vehicle to the object in the display control apparatus 100 described above, the presentation image may be displayed only when the distance from the vehicle to the object are within a predetermined value. In such a case, the control unit 101 controls the display unit 400 so as to generate the certain image indicating the presentation image 50 to be overlapped on the object on the display medium 20 only for the object the distance from the vehicle to which detected by the recognition unit 200 is lower than or equal to a predetermined threshold value. The determination of whether the distance from the vehicle to the object is lower than or equal to the predetermined threshold value may be performed by the control unit 101 or another component. Which component performs the determination of whether the distance from the vehicle to the object is lower than or equal to the predetermined threshold value does not limit the scope of the present disclosure. In calculation of the distance from the vehicle to the object, the vehicle is an arbitrary point in a vehicle body or a sensing unit (not illustrated), which is defined by the specifications of the apparatus. The vehicle does not limit the scope of the present disclosure.

The display of the presentation image only for the object the distance from the vehicle to which is lower than or equal to the predetermined threshold value in the above manner prevents a double image from occurring when the occupant visually recognizes the object. This is because the reduction in the foreground viewability due to the double image is more difficult to occur with the decreasing distance from the vehicle to the object and with the decreasing distance from the viewpoint of the occupant to the display on the head up display. The double image means that the display on the head up display is doubled due to the difference between the distance from the vehicle to the object to which the occupant pays close attention and the distance from the viewpoint of the occupant to the display on the head up display when the occupant pays close attention to the object, such as a pedestrian or a white line, and the foreground viewability is reduced when the double image occurs.

Second Embodiment

A second embodiment of the present disclosure will now be descried with reference to the drawings. The control is performed so that no presentation image is displayed in the wiping area when the windshield is wiped by the wiper 30 in order to ensure the viewability of the object through the naked eyes of the occupant in the first embodiment. However, the viewability may be reduced again due to rainfall or the like after a predetermined time elapsed since the wiping by the wiper 30 and it may be necessary to display the presentation image again. Accordingly, in the second embodiment, the control is performed so that the presentation image is displayed again in the wiping area after a predetermined time elapsed since the wiping by the wiper. An example will be described in the second embodiment in which, in an intermittent action in which the wiper works at predetermined interval, the presentation image is projected again after a predetermined time elapsed since one wiping is completed on the assumption that the viewability is reduced during a time period from the time when one wiping is completed to a time when the next wiping is started.

Figure 10:
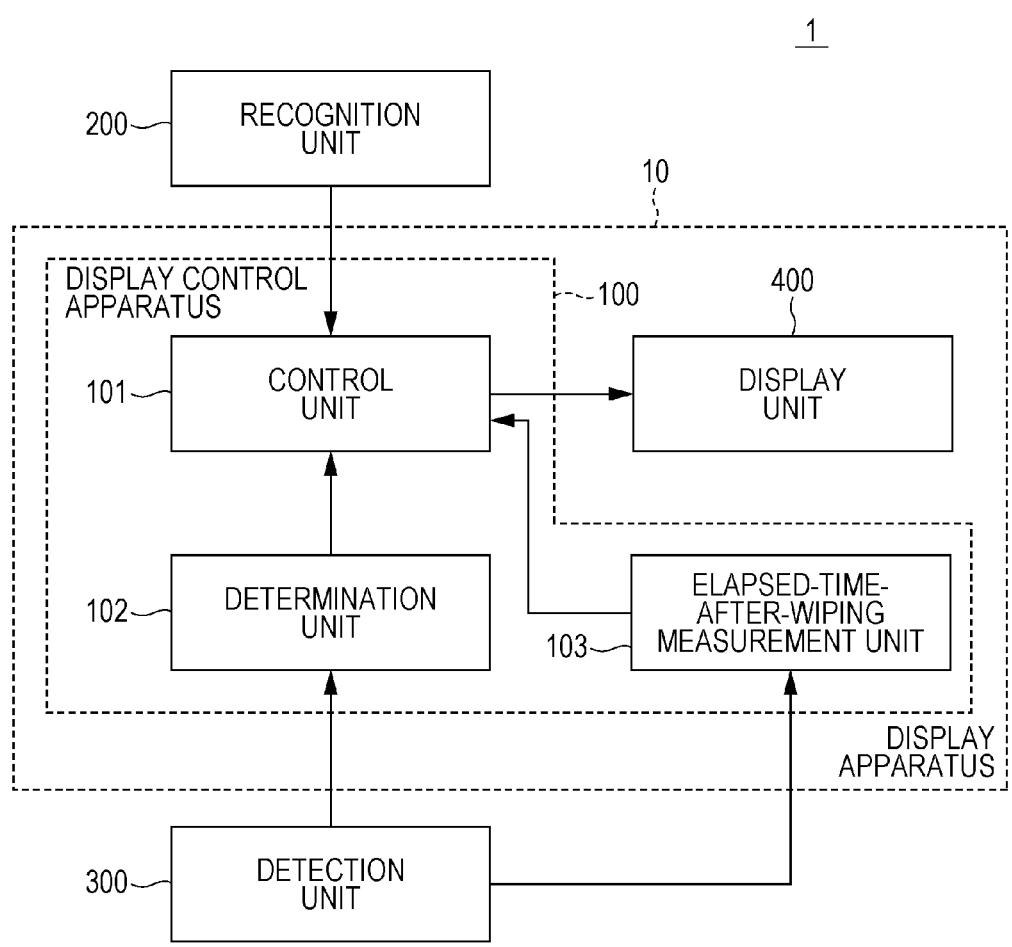
FIG. 10 is a block diagram illustrating an exemplary configuration of a display system according to the second embodiment of the present disclosure.

An exemplary configuration of the display system 1 according to the second embodiment will now be described. FIG. 10 is a block diagram illustrating the exemplary configuration of the display system 1 according to the second embodiment. The same reference numerals are used in FIG. 10 to identify the same components in FIG. 2. A description of such components is omitted herein.

Referring to FIG. 10, an elapsed-time-after-wiping measurement unit 103 acquires the wiping position information from the detection unit 300 and measures an elapsed time after wiping on the basis of the acquired wiping position information. The elapsed time after wiping is an elapsed time from a certain time when the wiping by the wiper 30 is performed (for example, a time when one reciprocation of the wiper 30 is completed) to the current time.

Figure 11:
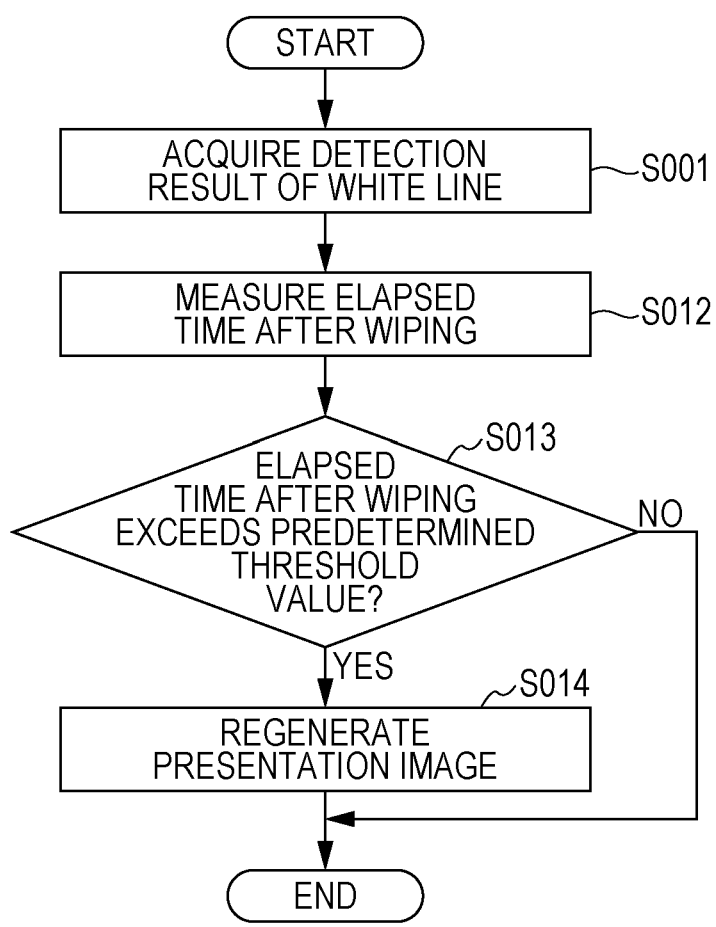
FIG. 11 is a flowchart illustrating an exemplary operational process of a display control apparatus according to the second embodiment of the present disclosure.

An exemplary operation of the display control apparatus 100 will now be described. FIG. 11 is a flowchart illustrating an exemplary operational process of the display control apparatus 100 according to the second embodiment. The flowchart in FIG. 11 illustrates the exemplary operational process from the time when the wiping of the windshield by the wiper is completed to the time when the next wiping is started. The exemplary operational process in FIG. 11 is performed at predetermined time interval, such as every 10 milliseconds or every 100 milliseconds. The flowchart in FIG. 11 is performed after the flowchart in FIG. 4 or FIG. 9. The same step number is used in the flowchart in FIG. 11 to identify the same step in FIG. 4. A description of such a step is omitted herein.

Referring to FIG. 11, after Step S001, in Step S012, the elapsed-time-after-wiping measurement unit 103 measures the elapsed time after wiping on the basis of the wiping position information acquired from the detection unit 300. For example, the elapsed-time-after-wiping measurement unit 103 measures the elapsed time from the time when one reciprocation of the wiper 30 is completed to the current time.

In Step S013, the control unit 101 determines whether the elapsed time after wiping measured by the elapsed-time-after-wiping measurement unit 103 exceeds a predetermined threshold value.

If the elapsed time after wiping does not exceed the threshold value as the result of the determination in Step S013 (NO in Step S013), the process in FIG. 11 is terminated.

If the elapsed time after wiping exceeds the threshold value as the result of the determination in Step S013 (YES in Step S013), in Step S014, the control unit 101 controls the display area 40 so as to generate the certain images indicating the presentation images 50 (for example, the presentation images 50*a* and 50*b* illustrated in FIG. 3, etc.) in the entire display area 40 on the display medium 20. This control causes the virtual images to be displayed again on the windshield.

As described above, the second embodiment is characterized in that the control is performed so that the virtual images are displayed again if the elapsed time since the wiping by the wiper has been performed exceeds a predetermined time. This control allows the front-side viewability to be ensured even when the front-side viewability is reduced due to rainfall or the like after the wiping by the wiper.

Third Embodiment

A third embodiment of the present disclosure will now be descried with reference to the drawings. In the third embodiment, the threshold value (the threshold value used in Step S013 in FIG. 11) described above in the second embodiment is varied depending on the working interval of the wiper to optimally control the redisplay timing of the virtual images.

Figure 12:
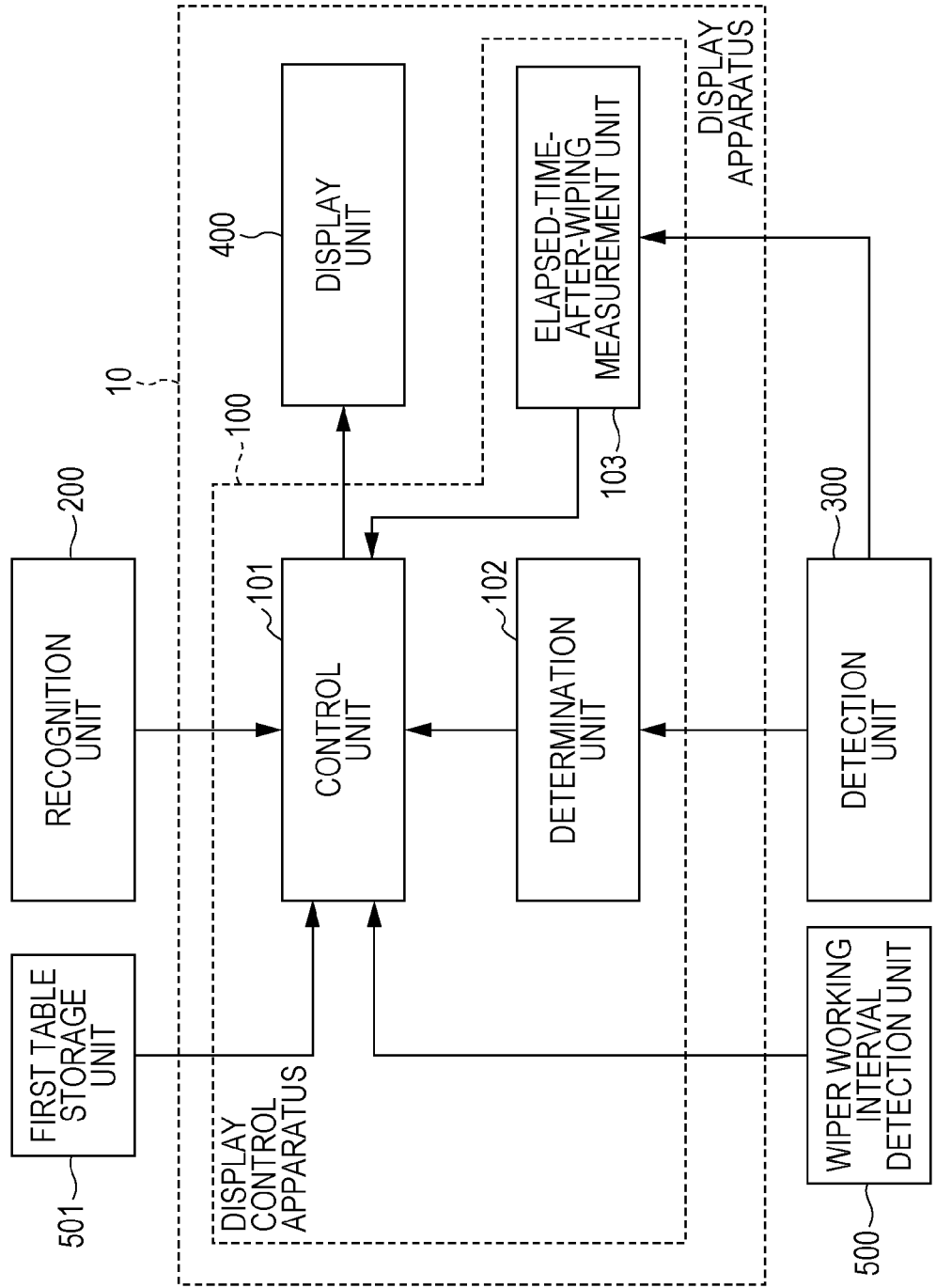
FIG. 12 is a block diagram illustrating an exemplary configuration of a display system according to the third embodiment of the present disclosure.

An exemplary configuration of the display system 1 according to the third embodiment will now be described. FIG. 12 is a block diagram illustrating the exemplary configuration of the display system 1 according to the third embodiment. The same reference numerals are used in FIG. 12 to identify the same components in FIG. 2 and FIG. 10. A description of such components is omitted herein.

Referring to FIG. 12, a wiper working interval detection unit 500 detects wiper working interval during the intermittent working of the wiper 30 from, for example, a timer that controls the intermittent working of the wiper 30. The wiper working interval means a time (unit: second) from the time when one reciprocation of the wiper 30 is completed to a time when the next reciprocation of the wiper 30 is started.

A first table storage unit 501 stores a first table in which information about the wiper working interval is associated with the threshold value used in the comparison with the elapsed time after wiping described above. For example, since it is supposed that light rain falls when the wiper working interval is long (for example, five seconds), it is supposed that it takes time to degrade the front-side visibility due to rain drops. Accordingly, a high value (for example, three seconds) is set as the threshold value. In contrast, it is supposed that heavy rain falls when the wiper working interval is short (for example, one second), it is supposed that the front-side visibility is degraded due to rain drops in a short time. Accordingly, a low value (for example, 0.5 seconds) is set as the threshold value. The threshold value is determined to be increased with the increasing wiper working interval in the first table, as described above.

Figure 13:
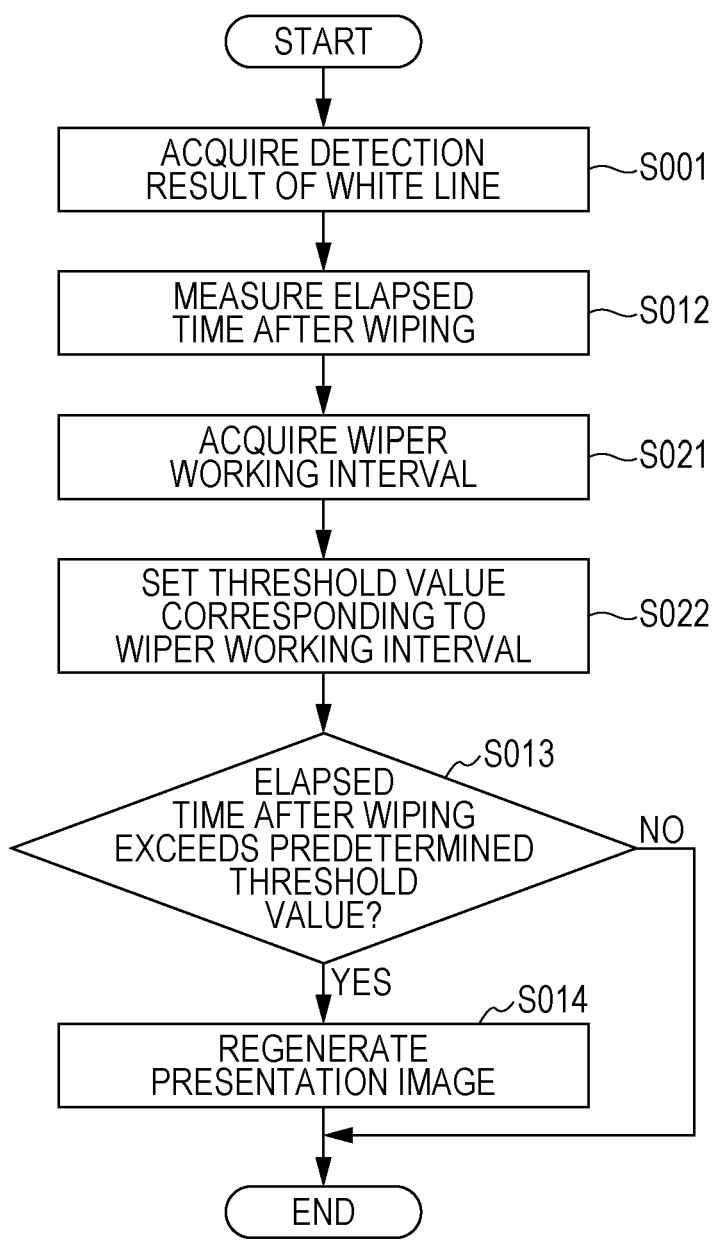
FIG. 13 is a flowchart illustrating an exemplary operational process of the display control apparatus according to the third embodiment of the present disclosure.

An exemplary operation of the display control apparatus 100 will now be described. FIG. 13 is a flowchart illustrating an exemplary operational process of the display control apparatus 100 according to the third embodiment. The flowchart in FIG. 13 illustrates the exemplary operational process from the time when the wiping of the windshield by the wiper is completed to the time when the next wiping is started. The exemplary operational process in FIG. 13 is performed at predetermined time interval, such as every 10 milliseconds or every 100 milliseconds. The flowchart in FIG. 13 is performed after the flowchart in FIG. 4 or FIG. 9. The same step numbers are used in the flowchart in FIG. 13 to identify the same steps in FIG. 4 and FIG. 11. A description of such steps is omitted herein.

Referring to FIG. 13, after Steps S001 and S012, in Step S021, the control unit 101 acquires the information about the wiper working interval detected by the wiper working interval detection unit 500. The control unit 101 reads out the first table from the first table storage unit 501.

In Step S022, the control unit 101 sets the threshold value corresponding to the information about the wiper working interval on the basis of the acquired information about the wiper working interval and the first table. Specifically, the control unit 101 searches the first table for the threshold value associated with the acquired information about the wiper working interval and sets the threshold value that is searched for as the threshold value used in Step S013. This threshold value is used in the comparison with the elapsed time after wiping in Step S013.

Then, Steps S013 and S014 are performed.

As described above, the third embodiment is characterized in that the control is performed so that the display timing of the virtual images is varied depending on the wiper working interval. This control allows the front-side viewability to be ensured even when the rainfall increases to rapidly degrade the visibility.

Fourth Embodiment

A fourth embodiment of the present disclosure will now be descried with reference to the drawings. In the fourth embodiment, the threshold value (the threshold value used in Step S013 in FIG. 11) described above in the second embodiment is varied depending on the velocity of the movable body to optimally control the redisplay timing of the virtual images. The velocity of the movable body is exemplified by a vehicle velocity in the fourth embodiment.

Figure 14:
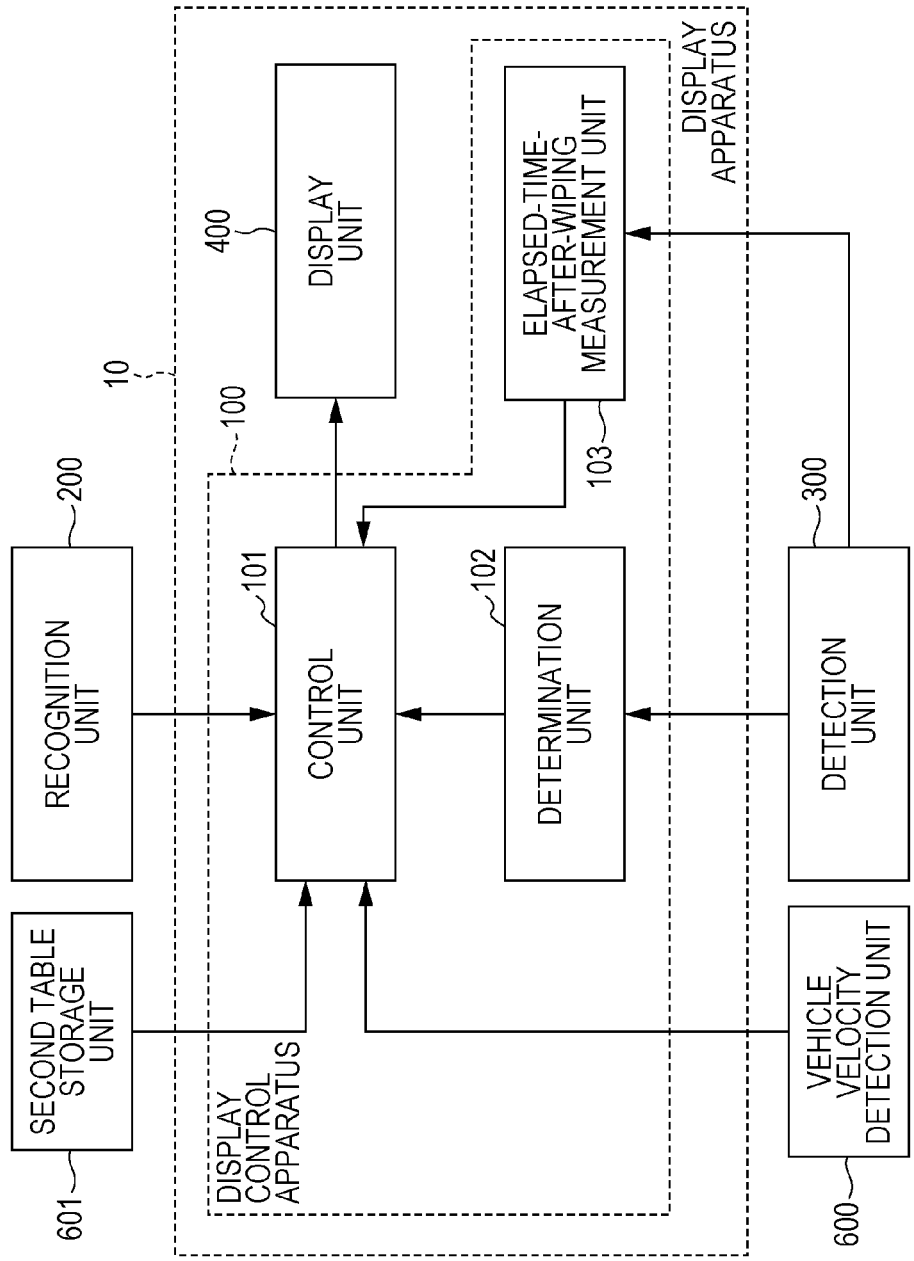
FIG. 14 is a block diagram illustrating an exemplary configuration of a display system according to the fourth embodiment of the present disclosure.

An exemplary configuration of the display system 1 according to the fourth embodiment will now be described. FIG. 14 is a block diagram illustrating the exemplary configuration of the display system 1 according to the fourth embodiment. The same reference numerals are used in FIG. 14 to identify the same components in FIG. 2 and FIG. 10. A description of such components is omitted herein.

Referring to FIG. 14, a vehicle velocity detection unit 600 detects the traveling velocity of the vehicle, that is, the vehicle velocity. For example, the vehicle velocity detection unit 600 may acquire the vehicle velocity value from a speedometer of the vehicle or an in-vehicle local area network (LAN) or may calculate the vehicle velocity value on the basis of Global Positioning System (GPS) information received via a network. The vehicle velocity value is a numerical value indicating the vehicle velocity and is an example of vehicle velocity information.

A second table storage unit 601 stores a second table in which the vehicle velocity value is associated with the threshold value used in the comparison with the elapsed time after wiping described above. For example, it is supposed that it takes time to degrade the front-side visibility due to rain drops when the vehicle velocity is low (for example, 20 km/h). Accordingly, a high value (for example, three seconds) is set as the threshold value. In contrast, it is supposed that the front-side visibility is degraded due to rain drops in a short time when the vehicle velocity is high (for example, 80 km/h). Accordingly, a low value (for example, 0.5 seconds) is set as the threshold value. The threshold value is determined to be decreased with the increasing vehicle velocity in the second table, as described above.

Figure 15:
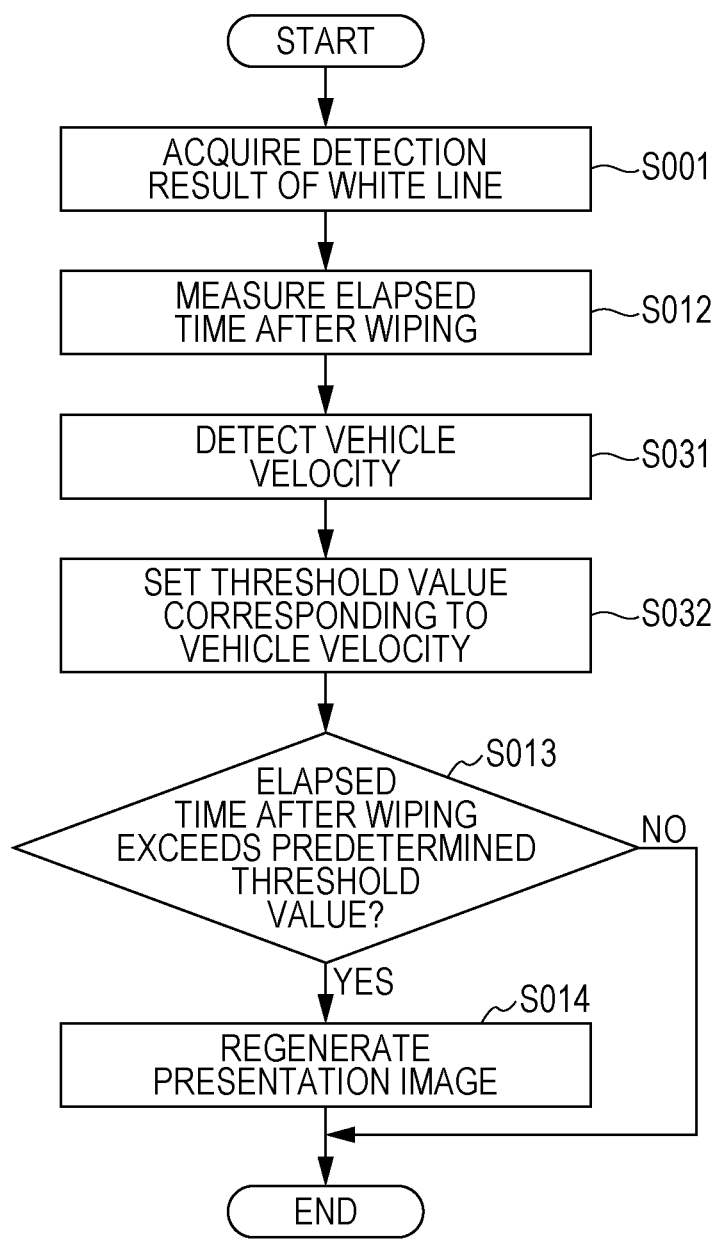
FIG. 15 is a flowchart illustrating an exemplary operational process of the display control apparatus according to the fourth embodiment of the present disclosure.

An exemplary operation of the display control apparatus 100 will now be described. FIG. 15 is a flowchart illustrating an exemplary operational process of the display control apparatus 100 according to the fourth embodiment. The flowchart in FIG. 15 illustrates the exemplary operational process from the time when the wiping of the windshield by the wiper is completed to the time when the next wiping is started. The exemplary operational process in FIG. 15 is performed at predetermined time interval, such as every 10 milliseconds or every 100 milliseconds. The flowchart in FIG. 15 is performed after the flowchart in FIG. 4 or FIG. 9. The same step numbers are used in the flowchart in FIG. 15 to identify the same steps in FIG. 4 and FIG. 11. A description of such steps is omitted herein.

Referring to FIG. 15, after Steps S001 and S012, in Step S031, the control unit 101 acquires the vehicle velocity value from the vehicle velocity detection unit 600. The control unit 101 reads out the second table from the second table storage unit 601.

In Step S032, the control unit 101 sets the threshold value corresponding to the vehicle velocity value on the basis of the acquired vehicle velocity value and the second table. Specifically, the control unit 101 searches the second table for the threshold value associated with the acquired vehicle velocity value and sets the threshold value that is searched for as the threshold value used in Step S013. This threshold value is used in the comparison with the elapsed time after wiping in Step S013.

Then, Steps S013 and S014 are performed.

As described above, the fourth embodiment is characterized in that the control is performed so that the display timing of the virtual images is varied depending on the vehicle velocity. This control allows the front-side viewability to be ensured even when the vehicle velocity is increased during the traveling at rainfall time to rapidly degrade the visibility.

Fifth Embodiment

A fifth embodiment of the present disclosure will now be descried with reference to the drawings. In the fifth embodiment, the threshold value (the threshold value used in Step S013 in FIG. 11) described above in the second embodiment is varied depending on the viewability of the display medium 20 to optimally control the redisplay timing of the virtual images. The display medium 20 is exemplified by the windshield in the fifth embodiment.

Figure 16:
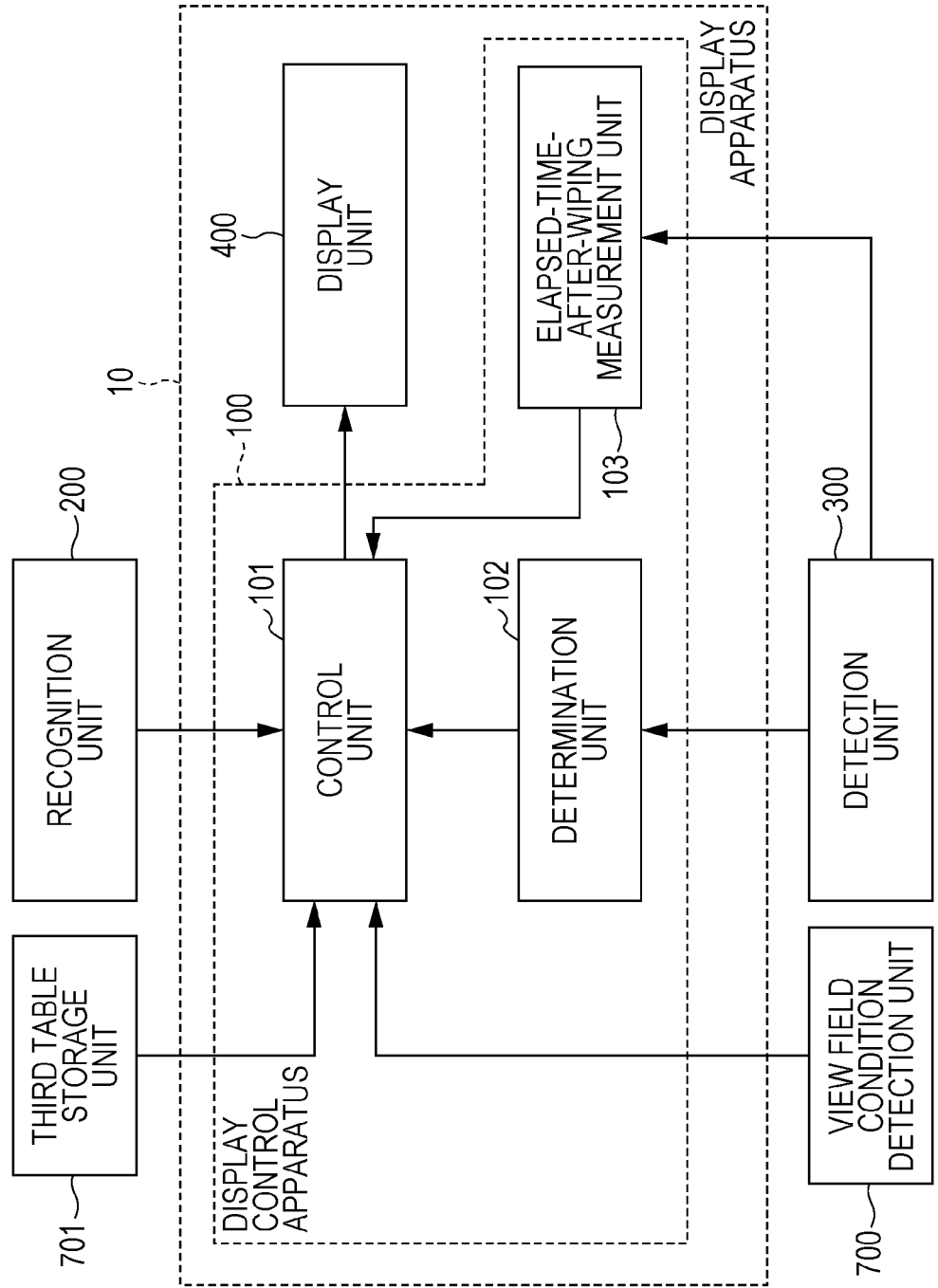
FIG. 16 is a block diagram illustrating an exemplary configuration of a display system according to the fifth embodiment of the present disclosure.

An exemplary configuration of the display system 1 according to the fifth embodiment will now be described. FIG. 16 is a block diagram illustrating the exemplary configuration of the display system 1 according to the fifth embodiment. The same reference numerals are used in FIG. 16 to identify the same components in FIG. 2 and FIG. 10. A description of such components is omitted herein.

Referring to FIG. 16, a view field condition detection unit 700 detects the degree of rain drops or dirt adhering to the windshield. For example, the view field condition detection unit 700 is a sensor that detects the degree of rain drops or dirt adhering to the windshield from an image captured by a camera that is provided in the vehicle and that captures an image of the front side of the vehicle. The numerical value indicating the degree of rain drops or dirt (that is, the degree of viewability of the windshield) detected by the view field condition detection unit 700 is hereinafter referred to as a "view field condition value" (an example of view field condition information).

A third table storage unit 701 stores a third table in which the view field condition value is associated with the threshold value used in the comparison with the elapsed time after wiping described above. For example, it is supposed that the front-side visibility is not degraded when the windshield is not dirty and the view field condition value is low. Accordingly, a high value (for example, three seconds) is set as the threshold value. In contrast, it is supposed that the front-side visibility is degraded when the windshield is dirty and the view field condition value is high. Accordingly, a low value (for example, 0.5 seconds) is set as the threshold value. The threshold value is determined to be decreased with the increasing view field condition value (with the reducing viewability) in the third table, as described above.

Figure 17:
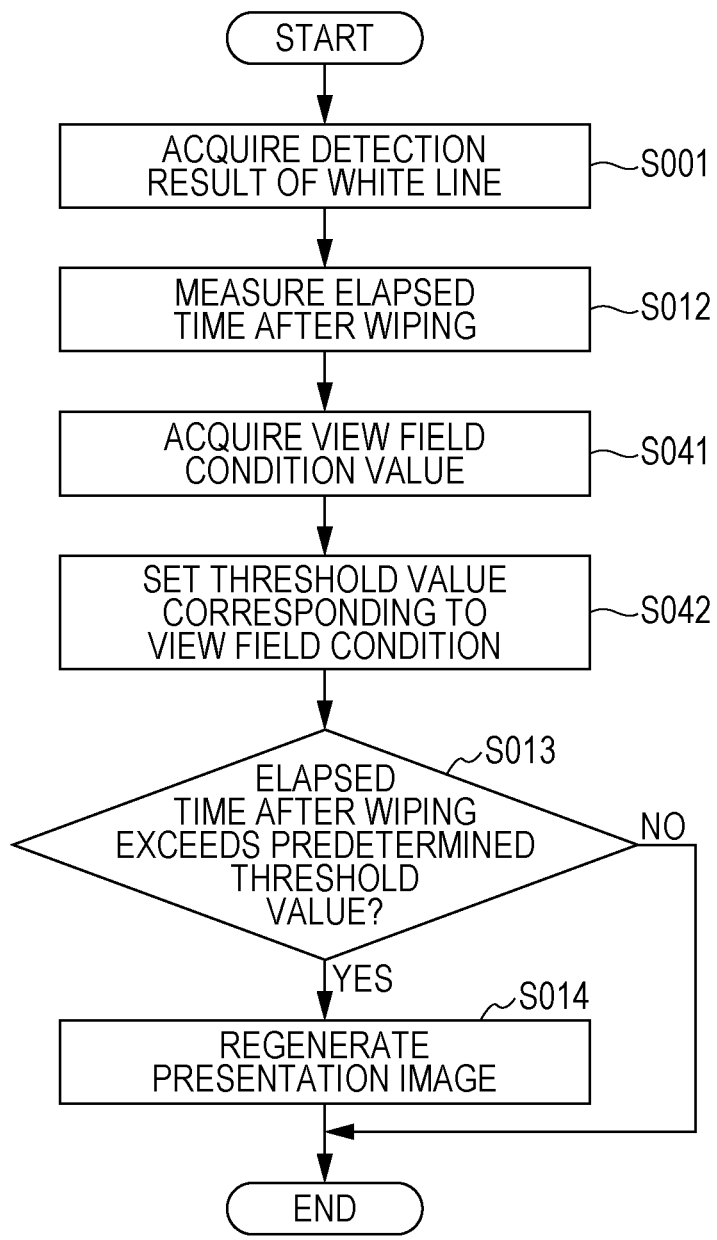
FIG. 17 is a flowchart illustrating an exemplary operational process of the display control apparatus according to the fifth embodiment of the present disclosure.

An exemplary operation of the display control apparatus 100 will now be described. FIG. 17 is a flowchart illustrating an exemplary operational process of the display control apparatus 100 according to the fifth embodiment. The flowchart in FIG. 17 illustrates the exemplary operational process from the time when the wiping of the windshield by the wiper is completed to the time when the next wiping is started. The exemplary operational process in FIG. 17 is performed at predetermined time interval, such as every 10 milliseconds or every 100 milliseconds. The flowchart in FIG. 17 is performed after the flowchart in FIG. 4 or FIG. 9. The same step numbers are used in the flowchart in FIG. 17 to identify the same steps in FIG. 4 and FIG. 11. A description of such steps is omitted herein.

Referring to FIG. 17, after Steps S001 and S012, in Step S041, the control unit 101 acquires the view field condition value from the view field condition detection unit 700. The control unit 101 reads out the third table from the third table storage unit 701.

In Step S042, the control unit 101 sets the threshold value corresponding to the view field condition value on the basis of the acquired view field condition value and the third table. Specifically, the control unit 101 searches the third table for the threshold value associated with the acquired view field condition value and sets the threshold value that is searched for as the threshold value used in Step S013. This threshold value is used in the comparison with the elapsed time after wiping in Step S013.

Then, Steps S013 and S014 are performed.

As described above, the fifth embodiment is characterized in that the control is performed so that the display timing of the virtual images is varied depending on the view field condition of the windshield. This control allows the front-side viewability to be ensured even when the rain drops or the dirt adheres to the windshield to rapidly degrade the visibility.

Sixth Embodiment

A sixth embodiment of the present disclosure will now be descried with reference to the drawings. In the sixth embodiment, the control is performed so that the aspect of the virtual image is continuously varied with the elapsed time after wiping in the redisplay of the virtual image.

Figure 18:
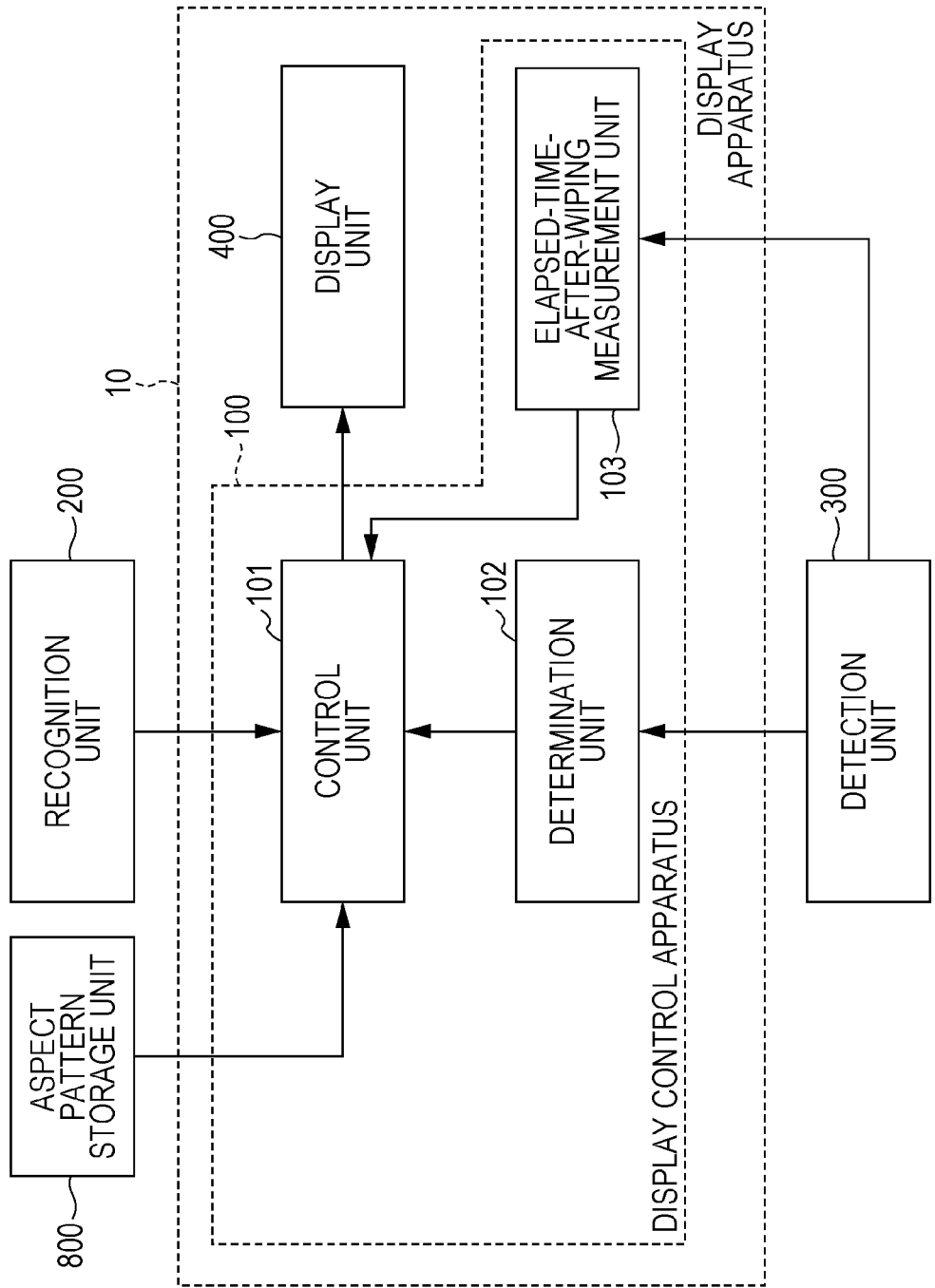
FIG. 18 is a block diagram illustrating an exemplary configuration of a display system according to the sixth embodiment of the present disclosure.

An exemplary configuration of the display system 1 according to the sixth embodiment will now be described. FIG. 18 is a block diagram illustrating the exemplary configuration of the display system 1 according to the sixth embodiment. The same reference numerals are used in FIG. 18 to identify the same components in FIG. 2 and FIG. 10. A description of such components is omitted herein.

Referring to FIG. 18, an aspect pattern storage unit 800 stores an aspect pattern in which the elapsed time after wiping is associated with the aspect of the virtual image. The aspect of the virtual image is, for example, a luminance, a color (for example, an RGB value), a size, a shape, or any combination of them. In the sixth embodiment, the aspect of the virtual image is exemplified by the luminance.

Figure 19A:
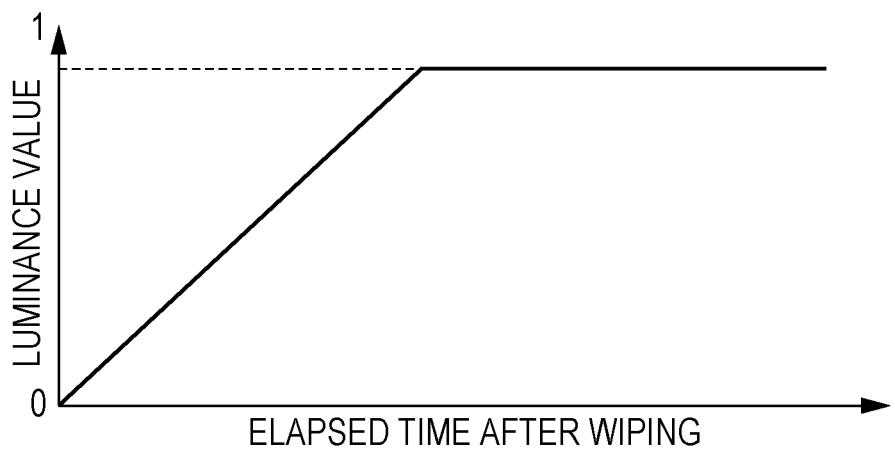
FIGS. 19A and 19B illustrate exemplary aspect patterns according to the sixth embodiment of the present disclosure.
Figure 19B:
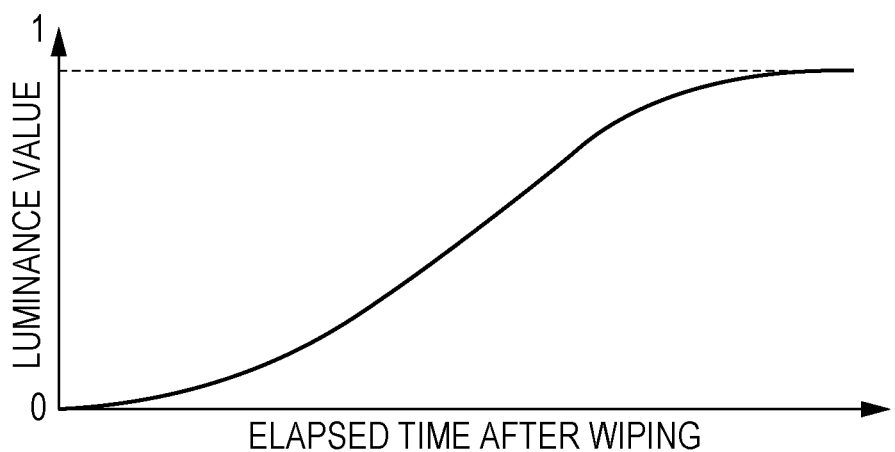

FIGS. 19A and 19B illustrate exemplary aspect patterns stored in the aspect pattern storage unit 800. In the exemplary aspect pattern in FIG. 19A, the luminance value (the relative value with respect to the maximum one) is increased in proportion to the elapse of the elapsed time after wiping and the luminance value is kept at one after a certain elapsed time after wiping. In the exemplary aspect pattern in FIG. 19B, the luminance value (the relative value with respect to the maximum one) is gradually increased with the elapse of the elapsed time after wiping and the luminance value reaches one at a certain elapsed time after wiping. Although the aspect pattern storage unit 800 stores the aspect pattern illustrated in FIG. 19A or FIG. 19B, the aspect pattern is not limited to the examples illustrated in FIGS. 19A and 19B.

Figure 20:
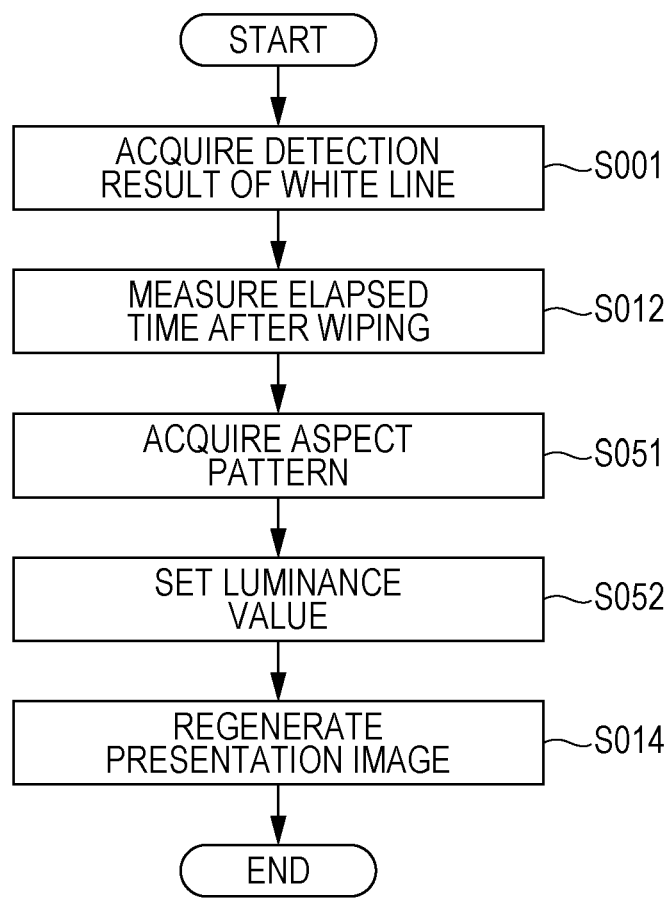
FIG. 20 is a flowchart illustrating an exemplary operational process of the display control apparatus according to the sixth embodiment of the present disclosure.

An exemplary operation of the display control apparatus 100 will now be described. FIG. 20 is a flowchart illustrating an exemplary operational process of the display control apparatus 100 according to the sixth embodiment. The flowchart in FIG. 20 illustrates the exemplary operational process from the time when the wiping of the windshield by the wiper is completed to the time when the next wiping is started. The exemplary operational process in FIG. 20 is performed at predetermined time interval, such as every 10 milliseconds or every 100 milliseconds. The flowchart in FIG. 20 is performed after the flowchart in FIG. 4 or FIG. 9. The same step numbers are used in the flowchart in FIG. 20 to identify the same steps in FIG. 4 and FIG. 11. A description of such steps is omitted herein.

Referring to FIG. 20, after Steps S001 and S012, in Step S051, the control unit 101 acquires the aspect pattern from the aspect pattern storage unit 800.

In Step S052, the control unit 101 sets the luminance value on the basis of the aspect pattern and the elapsed time after wiping. Specifically, the control unit 101 searches the aspect pattern for the luminance value associated with the elapsed time after wiping measured in Step S012 and sets the luminance value that is searched for as the value used in Step S014.

Then, Steps S014 is performed. The control unit 101 controls the display unit 400 so as to generate the certain image indicating the virtual image using the set luminance value.

As described above, the sixth embodiment is characterized in that the control is performed so that the aspect of the virtual image to be redisplayed is continuously varied with the elapsed time after wiping. This control causes the user to feel that the virtual image to be redisplayed is gradually displayed with time. In other words, it is possible to reduce the visual inconvenience for the user caused by the rapid redisplay of the virtual image.

The embodiments of the present disclosure are described above in detail with reference to the drawings. The functions of the components in the display system 1, the display apparatus 10, and the display control apparatus 100 in the above embodiments may be realized by a computer program.

Figure 21:
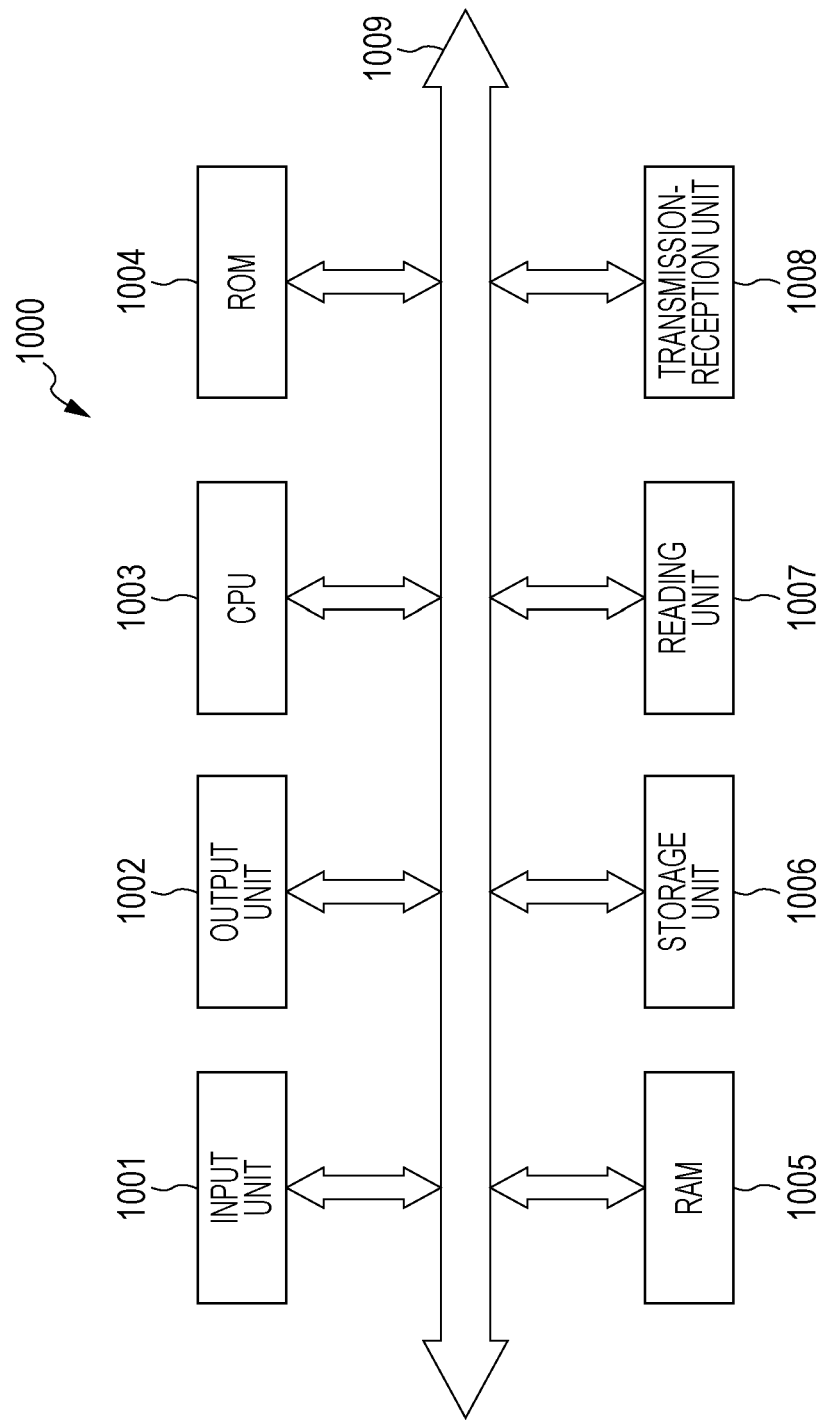
FIG. 21 illustrates an exemplary hardware configuration of a computer that realizes the functions of the components with a program according to an embodiment of the present disclosure.

FIG. 21 illustrates an exemplary hardware configuration of a computer that realizes the functions of the components with a program. Referring to FIG. 21, a computer 1000 includes an input unit 1001 including input buttons and a touch pad; an output unit 1002 including a display and a speaker; a central processing unit (CPU) 1003, a read only memory (ROM) 1004; a random access memory (RAM) 1005; a storage unit 1006, such as a hard disk device or a solid state drive (SSD); a reading unit 1007 that reads information from a recording medium, such as a digital versatile disk read only memory (DVD-ROM) or a universal serial bus (USB) memory; and a transmission-reception unit 1008 that performs communication via a network. These components are connected to each other via a bus 1009.

The reading unit 1007 reads out the program from the recording medium on which the program for realizing the functions of the components is recorded and the program is stored in the storage unit 1006. Alternatively, the transmission-reception unit 1008 may communicate with a server apparatus connected to the network to download the program for realizing the functions of the components from the server apparatus and the program may be stored in the storage unit 1006.

The CPU 1003 copies the program stored in the storage unit 1006 into the RAM 1005 and sequentially reads out instructions included in the program from the RAM 1005 to execute the instructions, thereby realizing the functions of the components. In the execution of the program, the information acquired in the various processes described above in the embodiments is stored in the RAM 1005 and the storage unit 1006 to be appropriately used.

Specifically, the display control program is a display control program executed in a display system including the recognition unit that recognizes a certain object existing in the landscape of the front direction or a side direction of the occupant of the movable body, the detection unit that detects the position of the wiper, which wipes the display medium at least including the windshield of the movable body, and the display unit that generates a certain image to display the certain image on the display medium. The display control program causes the computer to execute a step of causing the display unit to generate the first certain image indicating the first presentation image to be overlapped on the certain object in the display on the display medium on the basis of the result of the recognition of the certain object, a step of determining the wiping area wiped by the wiper on the display medium on the basis of the wiping position information detected by the detection unit after the first presentation image is displayed on the display medium, and a step of causing the display unit to generate the second certain image indicating the second presentation image resulting from deletion of a portion corresponding to the wiping area in the first presentation image in the display on the display medium.

The present disclosure is useful for the display control apparatus, the display control method, the display control program, and the display apparatus, which control display of information to be provided to a user (for example, an occupant of a vehicle or the like or a user wearing a display device).

What is claimed is:

1. A method of controlling a display control apparatus in a display system including a recognizer that recognizes a certain object existing in a front direction or a side direction of a movable body, a detector that detects a position of a wiper, which wipes a display medium at least including a windshield of the movable body, and a display that generates a certain image to display the certain image on the display medium, the method comprising:
   causing the display to generate a first certain image indicating a first presentation image to be overlapped on the certain object on the display medium on the basis of the recognized certain object;
   determining a wiping area wiped by the wiper on the display medium on the basis of detected position of the wiper after the first presentation image is displayed on the display medium; and
   causing the display to generate a second certain image indicating a second presentation image resulting from deletion of a portion corresponding to the wiping area in the first presentation image on the display medium,
   wherein, if a certain time elapsed since the display is caused to generate the second certain image, the display is caused to generate a third certain image indicating a third presentation image including the portion corresponding to the wiping area in the first presentation image on the display medium.

2. A method of controlling a display control apparatus according to claim 1,
   wherein, if a first certain time elapsed since the display is caused to generate the second certain image, the display is caused to generate a fourth certain image indicating a fourth presentation image in which a portion to be overlapped on the wiping area in the first presentation image is displayed in a first aspect on the display medium, and
   wherein, if a second certain time longer than the first certain time elapsed since the display is caused to generate the second certain image, the display is caused to generate a fifth certain image indicating a fifth presentation image in which the portion to be overlapped on the wiping area in the first presentation image is displayed in a second aspect.

3. A method of controlling a display control apparatus according to claim 2,
   wherein each of the first aspect and the second aspect is at least one of a luminance, a color, a shape, and a size of the corresponding presentation image.

4. A method of controlling a display control apparatus according to claim 1, further comprising:
   determining whether a distance from the movable body to the recognized certain object is lower than or equal to a predetermined threshold value,
   wherein the display is caused to generate the first certain image indicating the first presentation image to be overlapped on the certain object on the display medium only for the object the distance of which from the movable body is lower than or equal to the predetermined threshold value.

5. A display control apparatus in a display system including a recognizer that recognizes a certain object existing in a front direction or a side direction of a movable body, a detector that detects a position of a wiper, which wipes a display medium at least including a windshield of the movable body, and a display that displays a certain image generated on the basis of a result of the recognition by the recognition unit on the display medium, the display control apparatus comprising:
   a determiner that determines a wiping area wiped by the wiper on the display medium on the basis of detected position;
   a controller that controls the display so as to generate the certain image indicating a presentation image to be overlapped on the certain object in an area other than the determined wiping area on the display medium on the basis of the recognized certain object; and
   a measurer that measures an elapsed time, which indicates a time elapsed since the wiping by the wiper,
   wherein, if the elapsed time after wiping exceeds a predetermined threshold value, the controller controls the display so as to generate the presentation image in the wiping area, and
   wherein the controller acquires information about a working interval of the wiper and sets the predetermined threshold value so as to be increased with the increasing working interval of the wiper.

6. The display control apparatus according to claim 5,
wherein the determiner determines whether the wiper has worked on the basis of the detected position and, if the determiner determines that the wiper has worked, the determiner determines the wiping area.

7. The display control apparatus according to claim 5,
wherein the controller acquires information about a velocity of the movable body and sets the predetermined threshold value so as to be decreased with the increasing velocity of the movable body.

8. The display control apparatus according to claim 5,
wherein the controller acquires information about a degree of viewability of the display medium and sets the predetermined threshold value so as to be decreased with the reducing viewability.

9. The display control apparatus according to claim 5,
wherein the controller controls the display so as to generate the presentation image in a first aspect in the wiping area after a first elapsed time elapsed and generate the presentation image in a second aspect in the wiping area after a second elapsed time later than the first elapsed time after wiping elapsed.

10. The display control apparatus according to claim 9,
wherein each of the first aspect and the second aspect is at least one of a luminance, a color, a shape, and a size of the corresponding presentation image.

11. A display apparatus in a display system including a recognizer that recognizes a certain object existing in a front direction or a side direction of a movable body and a detector that detects a position of a wiper, which wipes a display medium at least including a windshield of the movable body, the display apparatus comprising:
 a display that generates a certain image to display the certain image on the display medium;
 a determiner that determines a wiping area wiped by the wiper on the basis of detected position;
 a controller that, if the certain object is recognized by the recognizer, controls the display so as to generate the certain image indicating a presentation image to be overlapped on the certain object in an area other than the wiping area; and
 a measurer that measures an elapsed time, which indicates a time elapsed since the wiping by the wiper,
 wherein, if the elapsed time after wiping exceeds a predetermined threshold value, the controller controls the display so as to generate the presentation image in the wiping area, and
 wherein the controller acquires information about a working interval of the wiper and sets the predetermined threshold value so as to be increased with the increasing working interval of the wiper.

* * * * *